United States Patent
Kim et al.

(10) Patent No.: US 9,461,847 B2
(45) Date of Patent: Oct. 4, 2016

(54) IPTV SERVICE PROVISION METHOD AND SYSTEM FOR FIXED AND MOBILE DEVICES

(75) Inventors: Jun Hyung Kim, Suwon-si (KR); Sung Oh Hwang, Yongin-si (KR); Bo Sun Jung, Seongnam-si (KR); Ji Eun Keum, Suwon-si (KR); Ho Yeon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 1817 days.

(21) Appl. No.: 12/632,081

(22) Filed: Dec. 7, 2009

(65) Prior Publication Data

US 2010/0150123 A1 Jun. 17, 2010

(30) Foreign Application Priority Data

Dec. 5, 2008 (KR) .................... 10-2008-0123383
Jan. 29, 2009 (KR) .................... 10-2009-0006850

(51) Int. Cl.
*H04L 12/56* (2006.01)
*H04L 12/66* (2006.01)
*H04N 21/643* (2011.01)

(52) U.S. Cl.
CPC ........ *H04L 12/66* (2013.01); *H04N 21/64322* (2013.01)

(58) Field of Classification Search
USPC ................................. 370/328, 401
See application file for complete search history.

(56) References Cited

U.S. PATENT DOCUMENTS

| | | |
|---|---|---|
| 2008/0235747 A1 | 9/2008 | Choi |
| 2009/0100492 A1* | 4/2009 | Hicks et al. .............. 725/127 |
| 2009/0222514 A1 | 9/2009 | Igarashi |
| 2010/0104103 A1* | 4/2010 | Guo et al. ................. 380/278 |

FOREIGN PATENT DOCUMENTS

| JP | 2007-272868 | 10/2007 |
|---|---|---|
| WO | WO 2008/123656 | 10/2008 |

OTHER PUBLICATIONS

Open IPTV Forum: "Open IPTV Forum Functional Architecture V 1.1", XP-007906507, Jan. 15, 2008.
Ignacio Mas et al., "IPTV Session Mobility", Third International Conference on Communications and Networking in China, IEEE, Aug. 25, 2008.

* cited by examiner

*Primary Examiner* — Pamit Kaur
(74) *Attorney, Agent, or Firm* — The Farrell Law Firm, P.C.

(57) ABSTRACT

An Internet Protocol (IP) TeleVision (IPTV) service provision method and system is provided for providing both fixed and mobile device users with IPTV services. The IPTV service provision method of the present invention includes establishing, when a Mobile-IPTV terminal function (M-ITF) including a first Open IPTV Terminal Function (OITF) having a plurality of functional entities and an embedded gateway having a plurality gateway functions detects a gateway function of an IPTV Terminal Function (ITF) including a second OITF having a plurality of functional entities and a plurality of gateways, a link with the gateway function of the ITF; disabling the embedded gateway; requesting a service provider network for an IPTV service via the gateway function of the ITF; and establishing a service link with the service provider network to received the IPTV service.

12 Claims, 20 Drawing Sheets

IPTV SERVICE PROVISION METHOD AND SYSTEM FOR FIXED AND MOBILE DEVICES

PRIORITY

This application claims priority to two applications entitled "IPTV SERVICE PROVISION METHOD AND SYSTEM FOR FIXED AND MOBILE DEVICES" filed in the Korean Intellectual Property Office on Dec. 5, 2008 and Jan. 29, 2009 and assigned Serial Nos. 10-2008-0123383 and 10-2009-0006850, respectively, the contents of which are incorporated herein by reference.

BACKGROUND OF THE INVENTION

1. Field of the Invention

The present invention generally relates to Internet Protocol TeleVision (IPTV) services and, in particular, relates to an IPTV service provision method and system for providing both fixed and mobile device users with IPTV services.

2. Description of the Related Art

With the Internet Protocol (IP)-based convergence and integration of wired and wireless communication systems, the integration of communication and broadcast services is emerging as a new business model with promising marketability. As an example of the communication and broadcast integration, Internet Protocol Television (IPTV) technology allows integration of conventional TeleVision (TV), voice, and data technologies and supports interactivity, which allows users-participation, and thereby provides opportunities for various business models and services. Particularly, IPTV technology allows providing both fixed terminals (such as set-top boxes, Personal Computers (PCs), and television sets) and mobile devices (such as mobile phones, Personal Digital Assistants (PDAs), and laptop computers) with flexible communication and broadcast services in many environments using wired, wireless, and broadcast networks, thereby enabling various business opportunities.

FIG. 1 is a diagram illustrating residential network architecture according to Open IPTV Forum (OIPF) standards. The residential network architecture is composed of five functional entities, and the entire collection of these functional entities is called the IPTV Terminal Function (ITF) 110. The ITF includes an Open IPTV Terminal Function (OITF) entity 111, an Internet Protocol (IP) Multimedia Subsystem (IMS) Gateway (IG) entity 113, an Application Gateway (AG) entity 115, a Cache Server Pages (CSP) Gateway (CSPG) entity 117, and WAN Gateway (WG) 119.

FIG. 2 is a block diagram illustrating a configuration of the OITF entity 110 of FIG. 1.

In FIG. 2, the Multimedia Data Terminating Function (MDTF) 201 receives generic data sent over multicast channel, the User Profile Management 203 manages subscription information associated with a specific user, the Performance Monitor Client 205 provides feedback on service quality, and the Stream Session Management and Control 207 initiates and terminates content delivery sessions. The Stream Receiver 209 receives streamed content from the network, the Codecs 211 are responsible for decoding, scaling, and rendering of the streamed and downloaded content, the Decrypt 213 removes any encryption applied to the content under the control of the CSP function, and the CSP 215 is responsible for terminal centric service protection and content protection. The Declarative Application Environment (DAE) 217 is responsible for presentation of user interface to IPTV service, the IPTV service Discovery 219 discovers IPTV Service Providers and related services, the Metadata CG Client 221 is responsible for managing metadata-based content guides, remote management client 223 provides remote firmware updates and software management, and the OITF Embedded Application 225 is an optional function providing manufacturer's embedded applications for IPTV service. The OITF entity further includes the DLNA 227, Content Download 229, Internal Storage System 231, and Transmission Control Protocol/Internet Protocol (TCP/IP) functions 233. The detailed functions of the ITF are specified in the Functional Architecture v 1.1 of Open IPTV Forum. Accordingly, detailed descriptions on the individual function blocks are omitted herein. In FIG. 1, the gateways are logical entities for supporting various types of IPTV service structures. The IG is a logical entity for allowing the indoor devices to access managed network services based on an IMS core network and is responsible for conversion between Hypertext Transfer Protocol (HTTP) messages used in the home network and the Session Initiation Protocol (SIP) messages used in the IMS ore network. The AG is a logical entity that manipulates media streams, filters Content Guide data such as the broadcast service guide, supports proprietary applications through a Remote User Interface (RUI), and supports advanced blended communication services. A Content and Service Protection Gateway (CSPG) is a logical entity that allows the devices in an indoor network to process the IPTV service without complex service and content protection functions. A Content and Service Protection Gateway (CSPG) is a logical entity that provides conversion from content and service protection in the network to a secure authenticated channel between the CSPG and the OITF.

As described above, current IPTV systems are designed to operate with devices within users' premises. However, this user-premises centric system design is not appropriated for converged IPTV service. Conventional ITFs structured as shown FIG. 1 have no functionality for users to receive IPTV services by means of mobile devices, resulting in a lack of fixed-mobile convergence capabilities.

SUMMARY OF THE INVENTION

In order to overcome the problem of the prior art, the present invention provides an Internet Protocol (IP) TeleVision (IPTV) service provision method and system that provides converged communication and broadcast services.

The present invention further provides an IPTV service provision method and system that provides converged communication and broadcast services using various types of networks.

The present invention further provides an IPTV service provision method and system that provides both the fixed and mobile device users with converged communication and broadcast services.

The present invention further provides an IPTV service provision method and system that provides both the fixed and mobile device users with converged communication and broadcast services based on the interworking of various types of commercialized networks.

In accordance with an embodiment of the present invention, an IPTV service provision method includes establishing, when a Mobile-IPTV Terminal Function (M-ITF) including a first Open IPTV Terminal Function (OITF) having a plurality of functional entities and an embedded gateway having a plurality gateway functions detects a gateway function of an IPTV Terminal Function (ITF) including a second OITF having a plurality of functional entities and a plurality of gateways, a link with the gateway function of the ITF; disabling the embedded gateway; requesting a service provider network for an IPTV service via the gateway function of the ITF; and establishing a service link with the service provider network to received the IPTV service.

In accordance with another embodiment of the present invention, an IPTV service provision method includes discovering, when a Mobile-IPTV terminal function (M-ITF) including a first Open IPTV Terminal Function (OITF) having a plurality of functional entity and an embedded gateway having a plurality gateway functions detects a gateway function of an ITF including a second OITF having a plurality of functional entities and a plurality of gateways, the gateway function of the ITF; establishing a link with the ITF by means of the gateway function of the ITF; disabling the embedded gateway; transmitting a service request message in a Hyper-Text Transfer Protocol (HTTP) format to the gateway function of the ITF; transmitting the service request message in a Session Initiation Protocol (SIP) format from the gateway function to a service provider network; transmitting a service response message in an SIP format from the service provider network to the gateway function of the ITF; and receiving the service response message in an HTTP format from the gateway function of the ITF; and receiving an IPTV service provided by the service provider network via the ITF.

In accordance with another embodiment of the present invention, an IPTV service provision system includes an IPTV Terminal Function (ITF) including a first Open IPTV Terminal Function (OITF) having a plurality of functional entities and a plurality of gateways, the ITF being connected to a service provider network to provide an indoor IPTV service; and a Mobile-IPTV terminal function (M-ITF) including a second OITF having a plurality of functional entities and an embedded gateway having a plurality gateway functions, wherein the M-ITF establishes, when the gateway function is detected, a link with the gateway function of the ITF, disables the embedded gateway, receives the IPTV service provider by the service provider network via the ITF, enables, when a detachment of the M-ITF from the gateway function is detected, the embedded gateway, connects to the service provider network using the embedded gateway, and receives the IPTV service from the service provider network.

In accordance with another embodiment of the present invention, an IPTV service provision method includes discovering, when a legacy mobile device supporting a mobile broadcast service detects a gateway function of an IPTV Terminal Function (ITF) including an Open ITF (OITF) having a plurality of functional entities, a plurality of gateways, and an adaptation gateway, the gateways of the ITF; establishing a link to the ITF by means of the adaptation gateway; transmitting a service request message in a Hyper-Text Transfer Protocol (HTTP) format from the legacy mobile device to the adaptation gateway; establishing ADaPtation (ADP) interfaces between the adaptation gateway and the gateways of the ITF; transmitting the service request message in a Session Initiation Protocol (SIP) format from the adaptation gateway to a service provider network; transmitting a service response message in an SIP format from the service provider network to the adaptation gateway; receiving the service response message in an HTTP format from the adaptation gateway; and receiving an IPTV service from the service provider network via the ITF.

In accordance with still another embodiment of the present invention, an IPTV service provision system includes a legacy mobile device supporting a mobile broadcast service; an IPTV Terminal Function (ITF) including an OITF having a plurality of functional entities, a plurality of gateways, and an adaptation gateway; and a service provider network connected with the gateways of the ITF using a Session Initiation Protocol (SIP), wherein the legacy mobile device discovers, when a gateway function of the ITF is detected, gateway functions of the ITF, establishes a link with the service provider network via the adaptation gateway and the gateways of the ITF, and receives an IPTV service provided by the service provider network through the established clink.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EMBODIMENTS OF THE INVENTION

Figure 1:
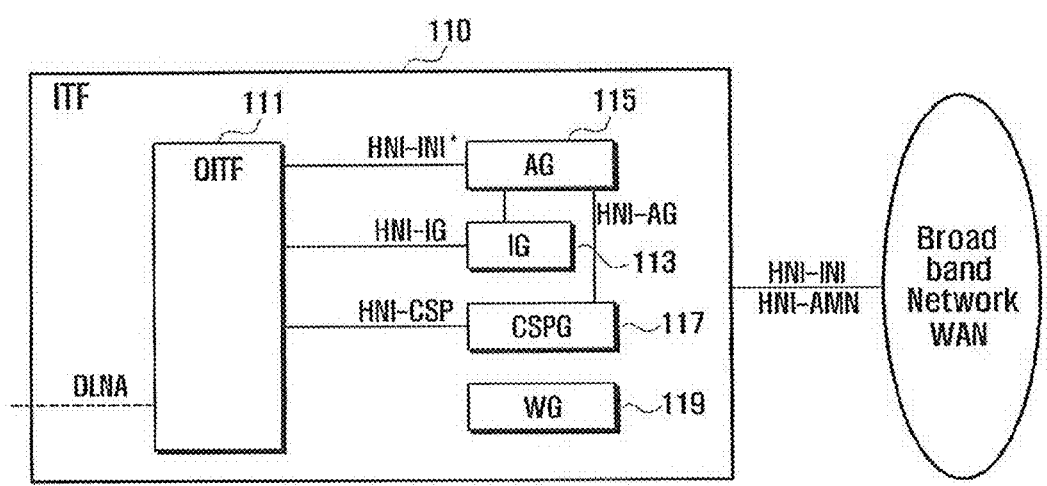
FIG. 1 is a diagram illustrating a residential network architecture according to Open IPTV Forum (OIPF) standards.

Embodiments of the present invention are described with reference to the accompanying drawings in detail. The same or similar reference numbers may be used throughout the drawings to refer to the same or similar parts. The described features and advantages of the invention may be combined in any suitable manner in one or more embodiments and one skilled in the art will recognize that the invention may be practiced without one or more of the specific features or advantages of a particular embodiment. Detailed descriptions of well-known functions and structures incorporated herein may be omitted to avoid obscuring the subject matter of the present invention.

In the following description, embodiments of the present invention are described to aid in the understanding of the invention. For the convenience, the following descriptions are described based on the technical specifications of OIPF as an IPTV standard, Open Mobile Alliance Broadcast Services Enabler Suite (OMA BOAST), Digital Video Broadcasting Convergence Broadcast Multicast Service (DVB-CBMS), and Media Forward Link Only (MediaFLO). However, the present invention is not limited by the contents and terms specified in the aforementioned standards or to the systems based on the aforementioned standards but can be applied to other similar systems.

The present invention relates to the structure and functions of the IP-based broadcast service (IPTV service). IPTV serviced were initially designed to provide broadcast television service over wired networks. With the advance of broadcast and communication technologies and increasingly diverse user requirements for various services over heterogeneous networks, there is a need to redesign the IPTV broadcast system architecture for supporting various devices through different networks. Particularly, providing mobile IPTV service is a challenging issue to overcome, given the mobility restrictions of IP-based broadcast systems. The present invention provides an IPTV service provision method and system for providing both the fixed and mobile devices with the IPTV services and system architecture and functions of network entities of the IPTV service provision system.

According to an embodiment of the present invention, the IPTV service provision system implemented such that an OIPF-enabled Mobile-ITF (M-ITF) can access the IPTV service via the wireless access network and indoor network, i.e. ITF, selectively. According to another embodiment of the present invention, the IPTV provision system is implemented to adapt the IPTV service to legacy mobile devices.

In previous IPTV service provision systems, an M-ITF can receive IPTV services via an outdoor OITF-enabled equipment wireless access network or an indoor ITF. In indoor environments, M-ITFs are preferably connected to an ITF rather than outdoor OITF-enabled equipment for receiving the IPTV service through a relatively low-cost wired link, as compared to a more expensive wireless link. The M-ITF can use various types of communication and broadcast-related services provided by the outdoor OITF-enabled equipment and the indoor ITF. The M-ITF can communicate with the ITF through the interfaces defined between the OITF and gateway functions such as Home Network Interface (HNI)-INI*, HNI-IMS Gateway Interface (HNI-IGI), and HNI-Content and Service Protection (HNI-CSP) interfaces. Both the OITF and M-ITF are provided with Digital Living Network Alliance (DLNA) functions so as to communicate with each other through DLNA link.

In the above structured IPTV service provision system, if the M-ITF enters the indoor network, the M-ITF performs a gateway discovery procedure for discovering the gateway function. The M-ITF can detect its own entry into the network by a user command (e.g. a key input of the user) or the receipt of the signal transmitted by gateway function of the ITF. According to an embodiment of the present invention, the present example is made with the assumption that the network entry is detected by discovering the indoor gateway of the ITF. Here, the gateway function can include the IG, AG, CSPG, and WG. The M-ITF finds the gateway function through the gateway discovery function, and the gateway also can recognize the network entry of the M-ITF. Once the M-ITF discovers the gateway function, the M-ITF registers with the service provider network through an IMS registration procedure via the gateway function. After the M-ITF is registered with the service provider network, the embedded gateway functions can be disabled by the user in order to receive the service via the indoor network.

Next, the M-ITF sends a service request message (HTTP message) to the indoor gateway function. Upon receiving the service request message, the indoor gateway function converts the service request message to an SIP message format and sends the service request message (as an SIP message) to the service provider network. If the service request message is received, the service provider network sends a service response message (as an SIP message) to the indoor gateway function of the ITF. The indoor gateway function converts the service response message (as an SIP message) into the HTTP format and sends the service request message (as an HTTP message) to the M-ITF.

When the M-ITF is located in the indoor environment, the M-ITF exchanges messages with the indoor gateway function periodically so as to maintain the registered state, thereby receiving the indoor IPTV service.

If the M-ITF leaves the indoor network, the indoor gateway cannot receive messages from the M-ITF. In order to detect that the M-ITF has left the indoor network, the indoor gateway function can manage a timer such that, when no message is received before a predetermined time expires, the indoor gateway function determines that the M-ITF has left from the indoor network, and deregisters the M-ITF. At this time, the indoor gateway function performs an IMS deregistration procedure with the service provider network. Also, the M-ITF recognizes the exit from the indoor network due to a lack of messages received from the indoor gateway function. If it is determined that the M-ITF is has left from the indoor network, the M-ITF activates the embedded function to access the IPTV service via the OITF equipment in the outdoor environment.

In another IPTV service provision system according to another embodiment of the present invention, the ITF further includes an Adaptation Gateway function for adapting the IP service to the legacy mobile devices such as BOAST, CBMS and MediaFLO devices. With the introduction of the Adaptation Gateway, new interfaces and messages are defined. An Adaptation Gateway is installed within an ITF to match the OIPF-based IPTV service with the legacy mobile broadcast services such as BOAST, CBMS, and MediaFLO. More specifically, the Adaptation Gateway is a functional entity for adapting the OITF-based IPTV service to legacy mobile devices supporting the BOAST, CBMS, and MediaFLO services. The Adaptation Gateway requests IPTV service via the AG, IG, and CSG and converts the IPTV service into a format suitable for legacy mobile devices. According to an embodiment of the present invention, the ITF includes new interfaces, including ADaPtation (ADP)-INI, ADP-IGI, and ADP-CSP, in order for the Adaptation Gateway to exchange data with the AG, IG, and CSPG. The ADP-INI interface is based on the HNI-INI* interface protocol for message exchange between the Adaptation Gateway and the AG, the ADP-INI interface is based on the HNI-IGI interface protocol for message exchange between the Adaptation Gateway and the IG, and the ADP-CSP interface is based on the HNI-CSP interface protocol for message exchange between the Adaptation Gateway and the CSPG.

Legacy mobile devices (such as BOAST, CBMS, and MediaFLO) are provided with an adaptation function for connecting to the ITF. The adaptation function is implemented to provide an interface with the adaptation gateway of the ITF for exchanging messages and data with the ITF. If necessary, the adaptation function can be provided with a data display format function. The interface between the adaptation gateway of the ITF and adaptation function of the legacy mobile device is determined according on the mobile broadcast service supported by a corresponding legacy mobile device. For example, an ADP-BCAST interface is defined for communication between the BOAST device and the Adaptation Gateway, an ADP-CBMS interface is defined for communication between the CBMS device and the Adaptation Gateway, and an ADP-FLO interface is defined for communication between the MediaFLO device and the Adaptation Gateway.

In the above structured IPTV service provision system, if a legacy mobile device enters the indoor network, the legacy mobile device performs a gateway discovery procedure to discover a gateway function and the adaptation gateway. The adaptation gateway or the gateway function can detect the indoor network entry of the legacy mobile device. Once the gateway function and the adaptation gateway are discovered, the legacy mobile device registers with the service provider network under the control of the adaptation gateway and the gateway function. Next, the legacy mobile device sends a service request message (HTTP message) to the adaptation gateway for the IPTV service. At this time, the service request message is transmitted using the protocol defining the ADP-BOAST, ADP-CBMS, and ADP-MediaFLO interfaces, and this protocol can be the HTTP. If the service request message (in the form of an HTTP message) is received from the legacy mobile device, the adaptation gateway converts the service request message to a format suitable for the indoor network and sends the converted service request message to the gateway function through the ADP-INI, ADP-IGI, and ADP-CSP interfaces. The gateway function converts the service request message to a SIP message format and sends the service request message (SIP message) to the service provider network.

The service provider network sends a service response message (SIP message) to the indoor gateway function of the ITF in response to the service request message. Upon receiving the service response message, the indoor gateway function forwards the service response message to the adaptation gateway through the ADP interfaces. The adaptation gateway converts the service response message to the HTTP format and sends the service response message (as an HTTP message) to the legacy mobile device.

Through the above-described procedure, legacy mobile devices can receive IPTV services as well as legacy mobile broadcast services.

In an indoor network, a legacy mobile device exchanges messages with the gateway function via the adaptation gateway periodically to maintain the registered state. If the legacy mobile device leaves the indoor network, the adaptation gateway cannot receive the message from the legacy mobile device so as to be deregistered from the service provider network. Even though the legacy mobile device cannot receive the IPTV service in the outdoor environment, the legacy can receive a legacy mobile broadcast service, e.g. BOAST, CBMS, or MediaFLO service. If it is detected that the legacy mobile device has left the indoor network, the gateway function performs a deregistration procedure with the service provider network.

Figure 3:
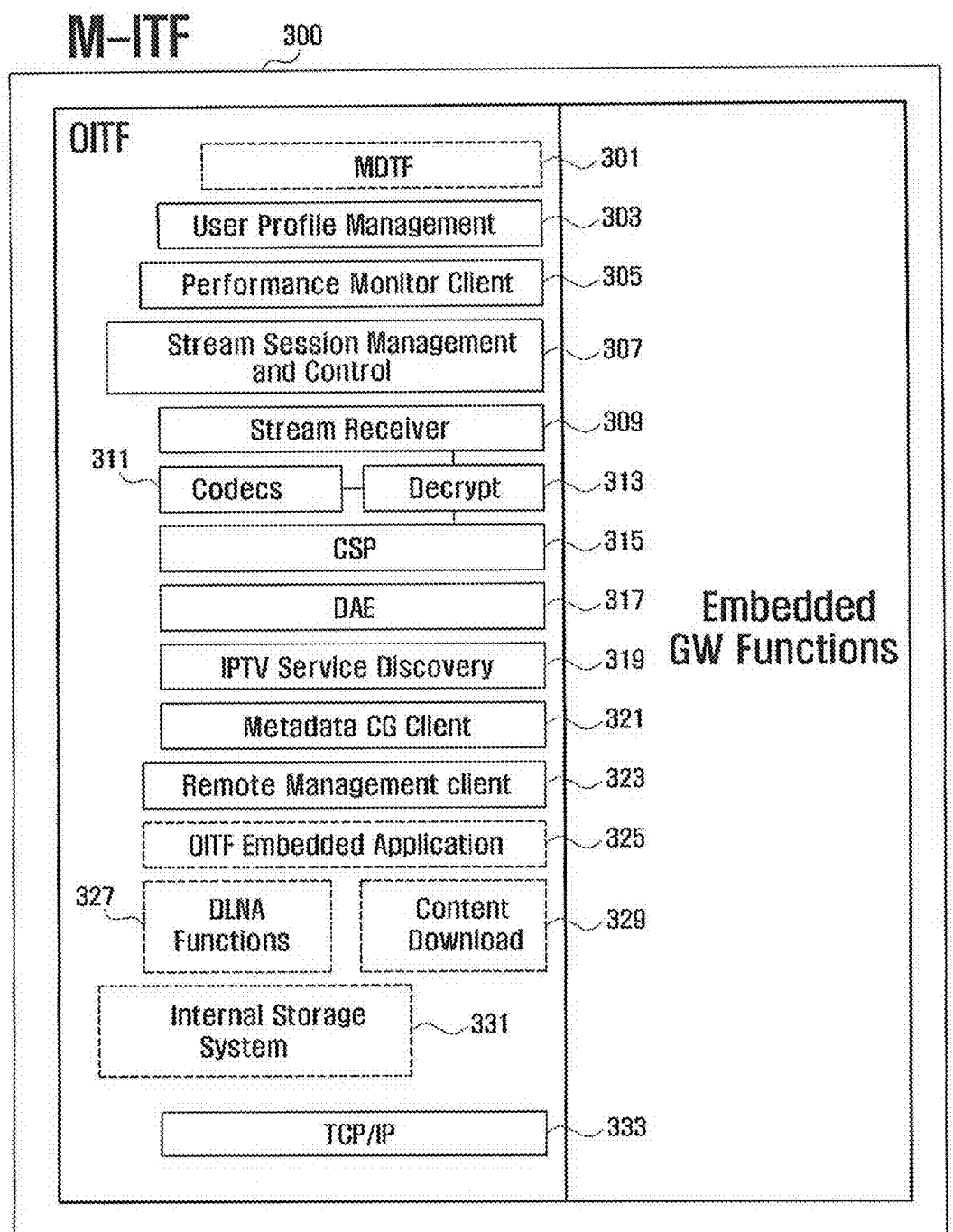
FIG. 3 is a diagram illustrating a configuration of an M-ITF for supporting the IPTV service according to an embodiment of the present invention.

FIG. 3 is a diagram illustrating a configuration of an M-ITF for supporting the IPTV service according to an embodiment of the present invention. The M-ITF includes an OITF and an embedded gateway functions.

Referring to FIG. 3, the M-ITF 300 includes the Multicast Data Terminating Function (MDTF) 301 receives generic data sent over multicast channel, the User Profile Management 303 manages subscription information associated with a specific user, the Performance Monitor Client 305 provides feedback on service quality, and the Stream Session Management and Control 307 initiates and terminates content delivery sessions. The Stream Receiver 309 receives streamed content from the network, the Codecs 311 are responsible for decoding, scaling, and rendering of the streamed and downloaded content, the Decrypt 313 removes any encryption applied to the content under the control of the CSP function, and the CSP 315 is responsible for terminal centric service protection and content protection. The Declarative Application Environment (DAE) 317 is responsible for presentation of user interface to IPTV service, the IPTV service Discovery 319 discovers IPTV Service Providers and related services, the Metadata CG Client 321 is responsible for managing metadata-based content guides, remote management client 323 provides remote firmware updates and software management, and the OITF Embedded Application 325 is an optional function providing manufacturer's embedded applications for IPTV service. The M-ITF further includes the DLNA 327, Content Download 329, Internal Storage System 331, and TCP/IP functions 333.

Figure 5:
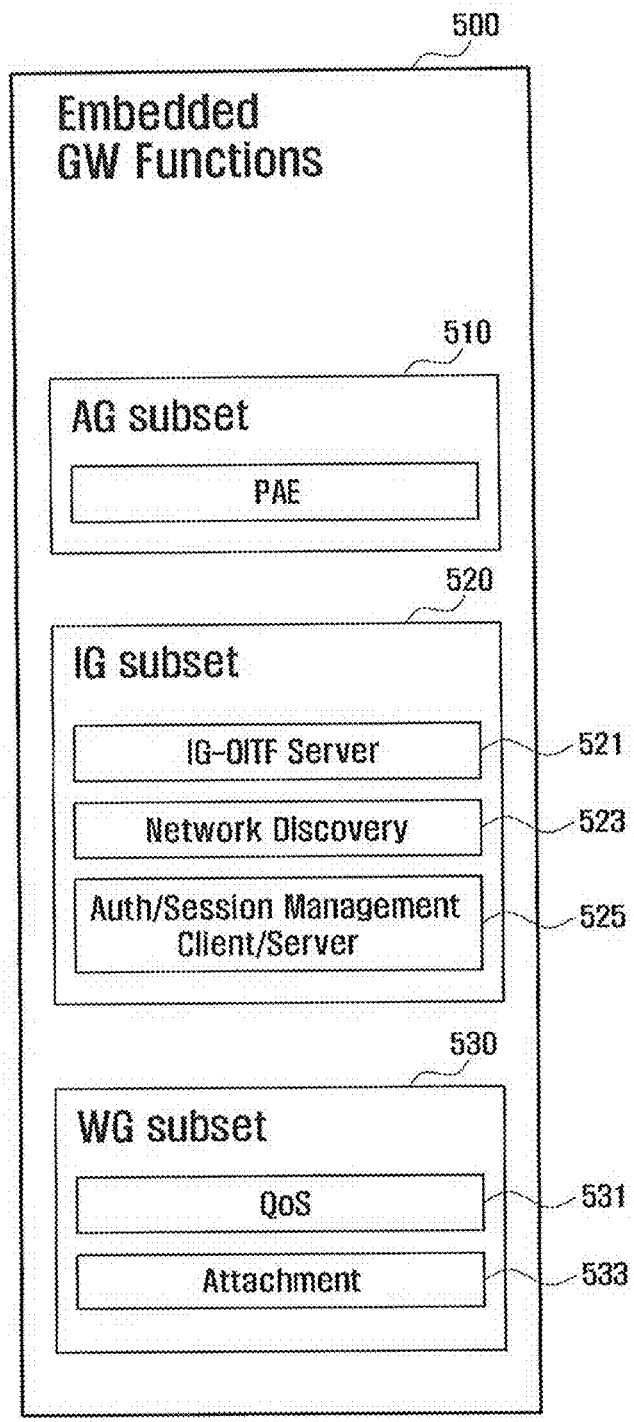
FIG. 5 is a block diagram illustrating a configuration of the Embedded GateWay (GW) Functions of FIG. 3.

The Embedded GateWay (GW) Functions can include the AG, IG, and WG as shown in FIG. 5.

In mobile devices using a specific radio technology such as technology according to the 3$^{rd}$ Generation Partnership Project (3GPP) includes, an IP Multimedia Services Identity Module (ISIM) is included basically to provide an IMS client function. The ISIM operates on a hardware entity called a Universal Integrated Circuit Card (UICC). In this case, the Embedded Gateway Functions are required to include an IG function for providing a similar function.

Figure 4:
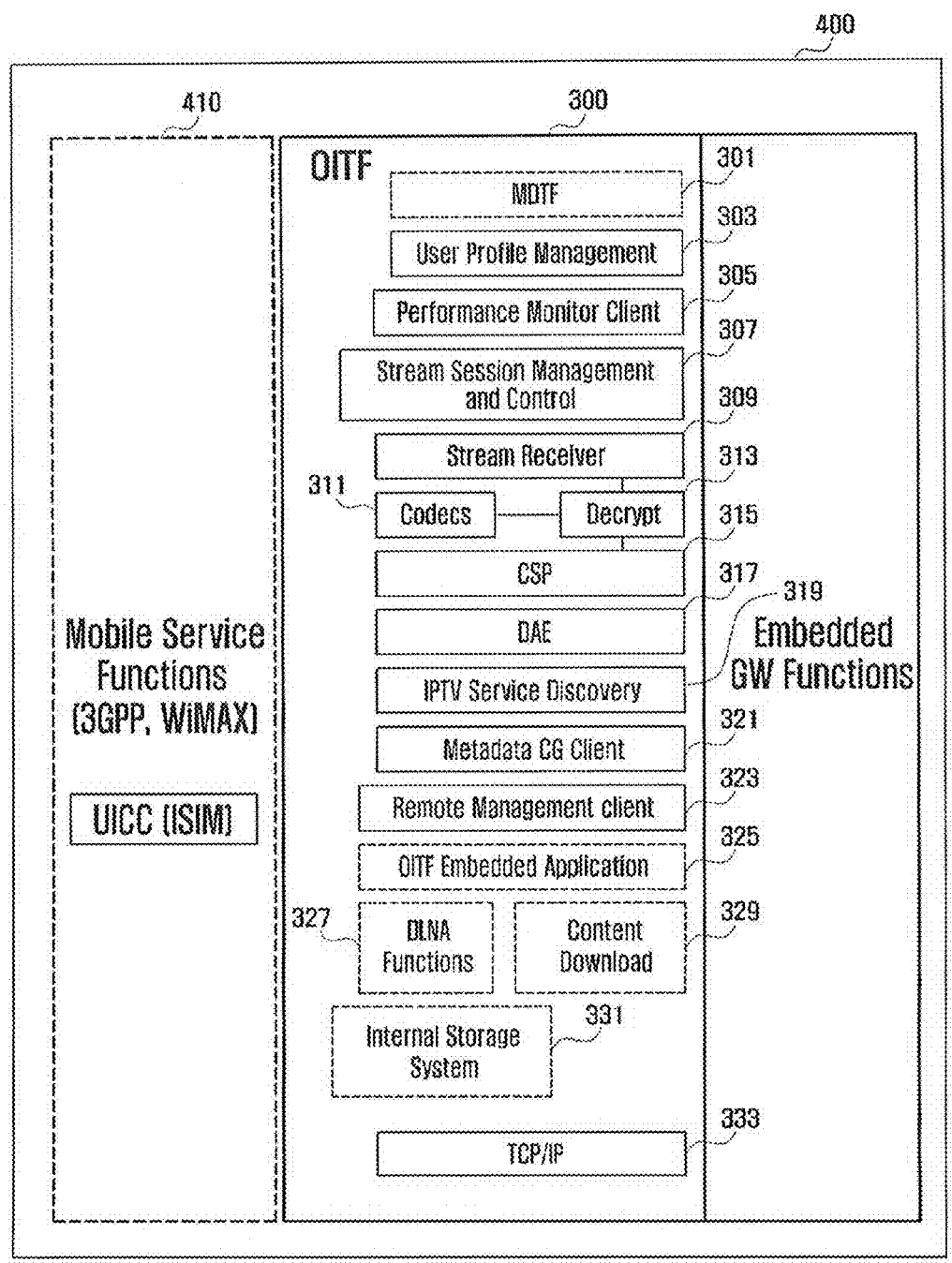
FIG. 4 is a diagram illustrating a configuration of a mobile device including an ISIM working as an IMS Gateway (IG) function according to an embodiment of the present invention.

FIG. 4 is a diagram illustrating a configuration of a mobile device including an ISIM working as an IG function according to an embodiment of the present invention.

Referring to FIG. 4, the UICC (ISIM) 410 includes functional entities for providing mobile service functions of the mobile device. The UICC (ISIM) 410 includes at least one of 3GPP, LTE, UMTS, WiMAX, and WiBro profiles depending on the implementation of the mobile device to support corresponding mobile service functions.

The OITF 300 of the mobile device has identical configuration and functionality as the M-ITF of FIG. 3 in configuration and functionality. The Embedded Gateway Functions can include the AG, IG, and WG and can be configured as shown in FIG. 5.

FIG. 5 is a block diagram illustrating a configuration of the Embedded GW Functions of FIGS. 3 and 4. As shown in FIG. 5, the Embedded GW Functions 500 include an AG subset 510, an IG subset 520, and a WG 530 subset for the M-ITF to receive the IPTV service.

The WAN Gateway (WG) subset 530 includes a Quality of Service (QoS) entity 531 and an attachment entity 533. The attachment entity 533 is responsible for accessing the wireless access network to connect to core network, and the QoS entity 531 manages a QoS of the IPTV service at the physical layer and the media access control layer and is responsible for classification, marking, remarking, and policing. The IMS Gateway (IG) subset 520 includes an IG-OITF Server entity 521, a Network Discovery entity 523, and an Authentication (Auth)/Session Management Client/Server entity 525. The Auth/Session Management Client/Server entity 525 is responsible for subscriber authentication and session management, the Network Discovery entity 523 is responsible for IMS core network providing the IPTV service and other supplementary services, and the IG-OITF Server entity 521 is responsible for performing communication functions between the IG and the OIPF and implemented in the form of an internal interface. The Application Gateway (AG) subset 510 includes a Procedural Application Environment (PAE) entity 511. The PAE entity 511 is responsible for media control, content guide management, and providing communication service.

The functional entities of FIG. 5 can be implemented according to the IPTV service used by the user and the IPTV usage environment.

The M-ITF structured as shown in FIG. 3 allows various types of mobile devices to receive the IPTV service in fixed and mobile environments and the M-ITF also supports various service usage environment of a user, and provides the user with converged fixed-mobile functionality.

Figure 6:
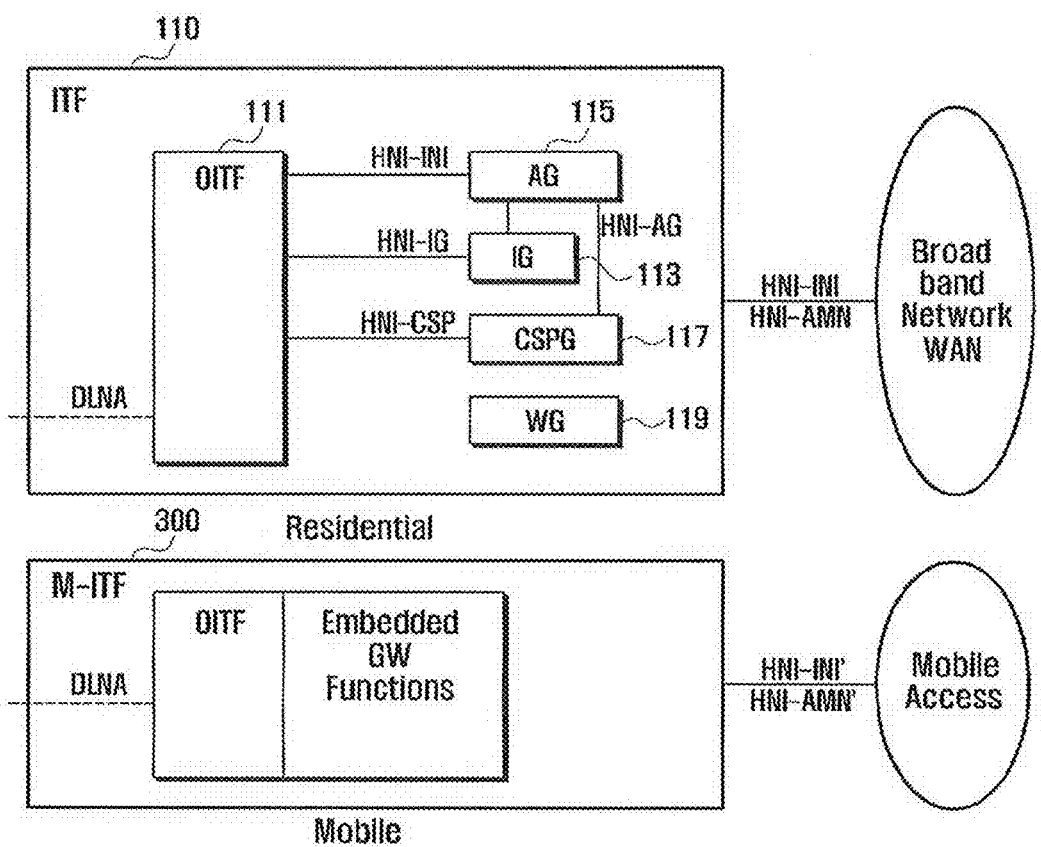
FIG. 6 is a diagram illustrating a configuration of an IPTV service provision system according to an embodiment of the present invention.

FIG. 6 is a diagram illustrating a configuration of an IPTV service provision system according to an embodiment of the present invention.

Referring to FIG. 6, the IPTV service provision system according to an embodiment of the present invention includes an ITF structured as shown in FIG. 1 and an M-ITF 300 structured as shown in FIG. 3. That is, the IPTV service provision system is implemented by adding the M-ITF 300 of FIG. 3 to an IPTV system similar to the IPTV system 110 of FIG. 1. The M-ITF 300 is configured to receive the IPTV service through a wired link or an indoor network by means of the OITF entity and through a wireless link with the full functionalities of the M-ITF, thereby overcoming the mobility restrictions of the IPTV service.

Figure 7:
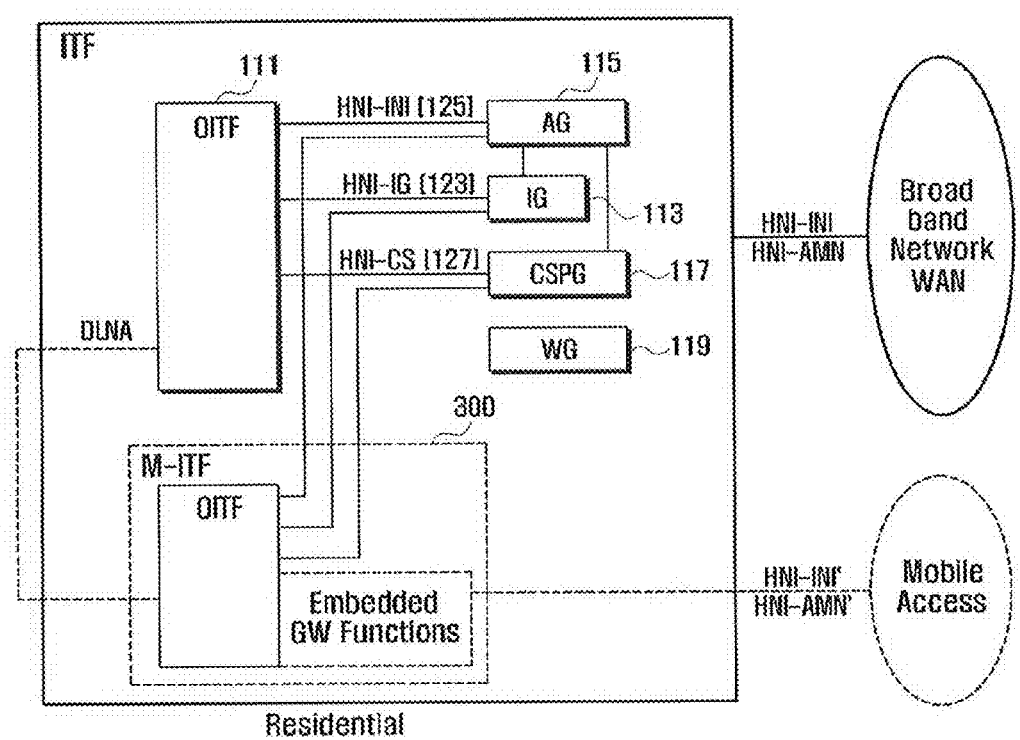
FIG. 7 is a diagram illustrating the IPTV service provision system when the M-ITF is connected to the ITF of FIG. 5 via an OIPF-compliant equipment in the indoor environment.

FIG. 7 is a diagram illustrating an IPTV service provision system according to an embodiment of the present invention when the M-ITF 300 is connected to the ITF of FIG. 6 via an OIPF-compliant equipment in the indoor environment.

Referring to FIG. 7, the M-ITF 300 can access the IPTV service independently and via the ITF or an OIPF-compliant equipment in the indoor environment. Preferably, the M-ITF 300 accesses the IPTV service by means of an OIPF function in the indoor environment. The preferably M-ITF operates in an OIPF-manner for various reasons. One of the main reasons that the OIPF function is preferred is that the IPTV service access through the wired link by means of the ITF is less expensive than IPTV service access through a wireless link by means of a wireless access point. Also, a user can use the various types of communication and IPTV-related supplementary services provided by both the M-ITF 300 and the OITF-compliant equipment. The M-ITF 300 can exchange messages and data with the AG 115, IG 113, and CSPG 117 of the ITF through interfaces corresponding to the HNI-INI* 125, HNI-IG 123, and HNI-CSP 127 interfaces between the OITF and the gateway function.

As shown in FIG. 7, in case that the M-ITF 300 is connected to the OIPF-compliant equipment or enters the indoor network, there can be the functions overlapped with the pre-existing functions. Accordingly, there is a need to reset the overlapping functions among the M-ITF 300, OITF 111, AG 115, IG 113, CSPG 117, and WG 119 to operate in a harmonized manner.

Procedures for selecting functions in the IPTV service provision system according to an embodiment of the present invention are described with reference to FIGS. 8, 9, and 10.

Figure 8:
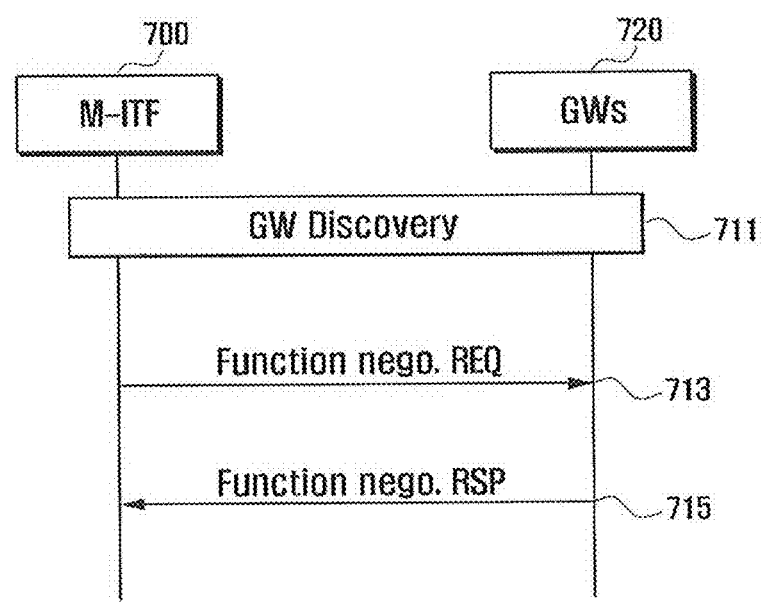
FIG. 8 is a sequence diagram illustrating operations of the M-ITF and GWs for selecting functions to be used among the Embedded GW Functions in the IPTV service provision system according to an embodiment of the present invention.

FIG. 8 is a sequence diagram illustrating operations of an M-ITF 700 and GWs 720 for selecting functions to be used among the Embedded GW Functions in an IPTV service provision system according to an embodiment of the present invention.

Referring to FIG. 8, if the gateway function is found in the indoor network, the M-ITF 700 checks which gateways exist in the indoor network, in step 711. That is, the M-ITF negotiates capabilities with the respective found gateways. When all the gateways 720 are physically integrated into a gateway function block, the M-ITF 700 can perform the negotiation with the gateway function block at a time. Next, the M-ITF 700 selects the functions to use among the Embedded GW functions and sends a Function negotiation request (i.e., Function nego. REQ) message to the gateway function, in step 71), and the gateway function sends a Function negotiation response (i.e., Function nego. RSP) message to the M-ITF 700 in response to the Function nego. REQ message, in step 715. Table 1 shows details of the function negotiation messages. The criteria for selecting a specific function can be changed according to the IPTV service subscribed by the user or the type of the mobile device. These criteria are set as described because the AG optimized for the mobile device is more suitable for the service to be provided to the mobile device as compared to the universal AG used in the indoor network. Table 1 defines the Function nego. REQ message and the Function nego. RSP message that are exchanged between the M-ITF and the indoor gateway function. The Embedded GW functions information included in the Function nego. REQ message contain only the functions to be used in the M-ITF.

TABLE 1

| Message Name | Information | Description |
| --- | --- | --- |
| Function nego. REQ | Device ID Embedded GW Functions PAE Network Discovery Etc. | Include only the functions to be used in the M-ITF among the Embedded GW Functions of the M-ITF. |
| Function nego. RSP | Device ID ACK/NACK Reason | Response to the Function nego. REQ message. When negotiation fails, it includes the reason of negotiation failure. |

Figure 9:
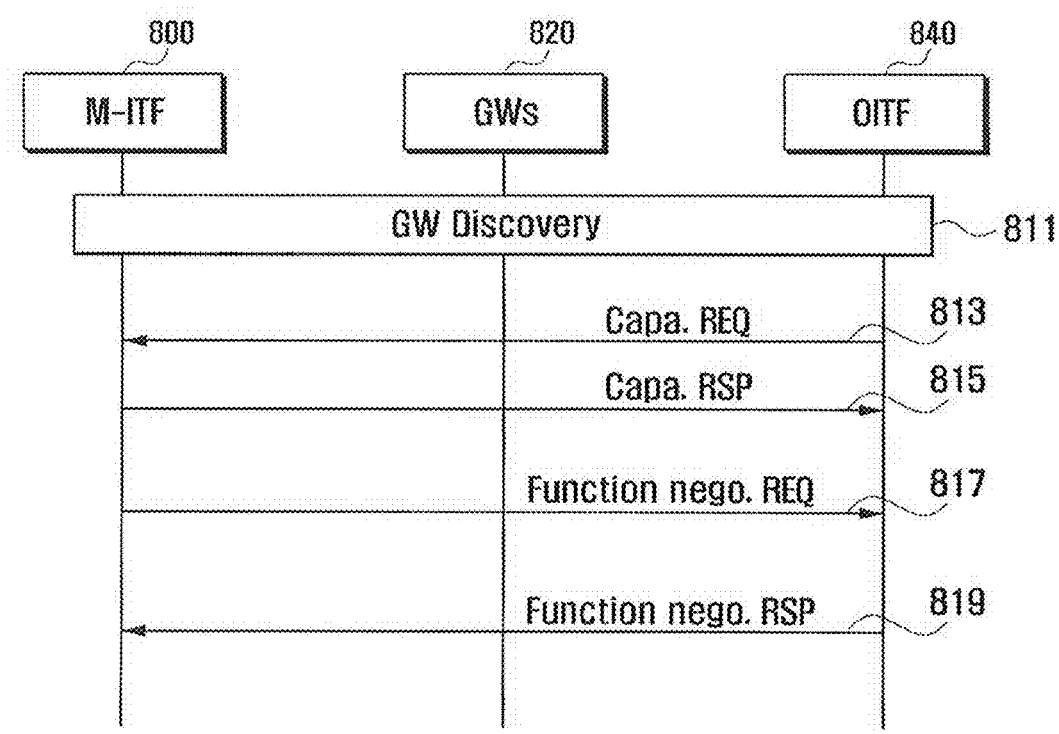
FIG. 9 is sequence diagram illustrating operations of the M-ITF, GWs, and OITF when the OITF selects functions to be used among the Embedded GW Functions in the IPTV service provision system according to an embodiment of the present invention.

FIG. 9 is sequence diagram illustrating operations of an M-ITF 800, GWs 820, and an OITF 840 when the OITF selects functions to be used among the Embedded GW Functions in the IPTV service provision system according to an embodiment of the present invention.

Referring to FIG. 9, if the M-ITF 800 enters the indoor network, the OITF checks the network entry of the M-ITF 800 through a GW discovery procedure, in step 811. If the network entry of the M-ITF 800 is detected, the OITF 840 sends a Capability Request (i.e., Capa. REQ) message to the M-ITF, in step 813, and the M-ITF sends a Capability Response (i.e., Capa. RSP) message to the OITF in response to the Capa. REQ message, in step 815. Table 2 shows details of the Capacity messages. The Capa. RSP message contains the Embedded GW functions.

Upon receipt of the Capa. RSP message, the OITF sends a Function negotiation request (i.e, Function nego. REQ) message to the M-ITF, in step 817, and the M-ITF sends a Function negotiation response (i.e., Function nego. RSP) message to the OITF.

The procedure of FIG. 9 protects indoor service, when the M-ITF 800 is not an indoor user device, by restricting the use of the indoor gateway function. Table 2 defines the Capa. REQ message and the Capa. RSP message that are exchanged between the M-ITF 800 and the gateway OITF 840.

TABLE 2

| Message Name | Information | Description |
| --- | --- | --- |
| Capa. REQ | Device ID | Transmit from OITF to M-ITF to request for Embedded GW Functions information of the M-ITF. |
| Capa. RSP | Device ID Embedded GW Functions | Includes Embedded GW Functions information in response to the Capa. REQ message. |

Figure 10:
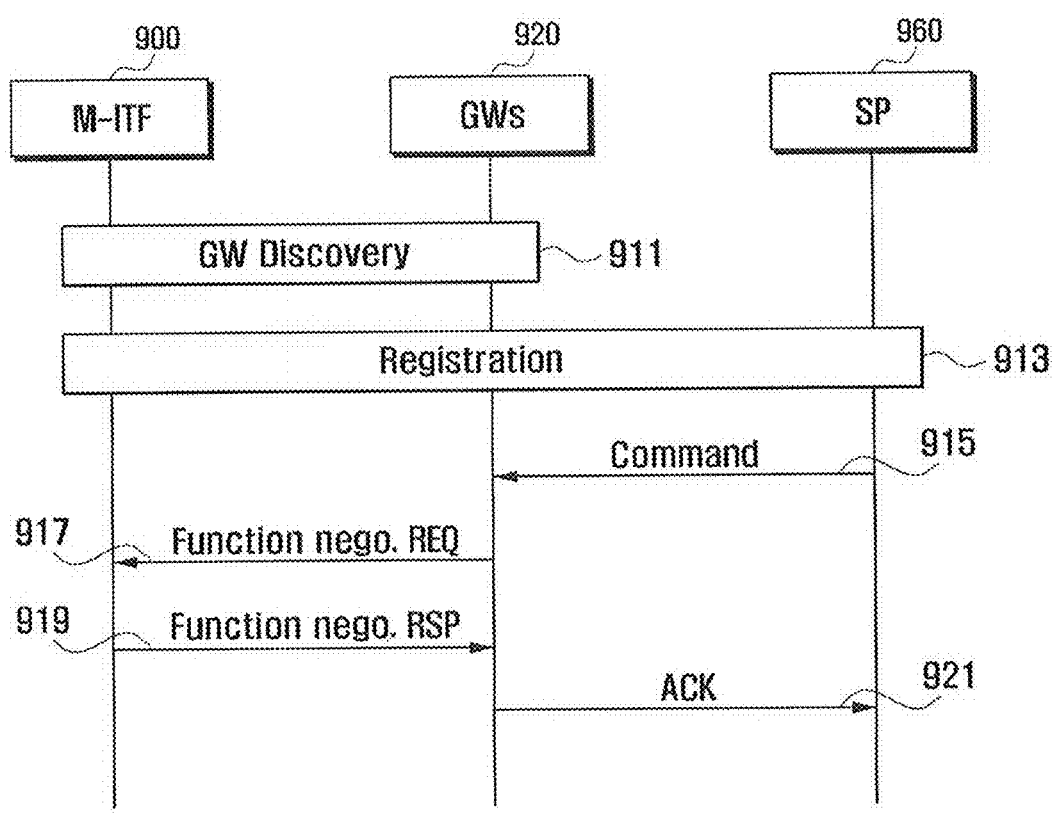
FIG. 10 is a sequence diagram illustrating operations of M-ITF, GWs, and Service Provider (SP) when the SP selects functions to be used among the Embedded GW Functions in the IPTV service provision system according to an embodiment of the present invention.

FIG. 10 is a sequence diagram illustrating operations of an M-ITF 900, GWs 920, and a Service Provider (SP) 960 when the SP selects functions to be used among the Embedded GW Functions in the IPTV service provision system according to an embodiment of the present invention.

Referring to FIG. 10, when the M-ITF 900 registers with the SP 960 via the indoor gateway function, the M-ITF 900 checks the subscribed service and functions of M-ITF, in step 911, and informs the SP 960 of the subscribed services and functions of the M-ITF 900. The SP 960 registers the subscribed service and the functions of the M-ITF 900, in step 913, and sends a Gateway function command to the GWs 920 for selecting the functions to be used by the M-ITF 900 among the Embedded GW Functions according to the type of the M-ITF 900. Upon receiving the Gateway function command, the GWs 920 send a Function negotiation request (i.e., Function nego. REQ) message to the M-ITF 900, in step 917, and the M-ITF 900 sends a Function negotiation response (i.e., Function nego. RSP) message to the GWs 920 in response to the Function nego. REQ message, in step 919. If the Function nego. RSP message is received, the GWs 920 send a Gateway Function ACKnowledgement (ACK) message to the SP 960 in response to the Gateway function command, in step 921. Table 3 shows details of the Gateway Function Command and ACK messages.

The procedure of FIG. 10 provides the M-ITF 900 with optimized services selected by the service provided according to the type of the M-ITF 900 and the available services without involvement of the user. Table 3 defines the Gateway Function Command and the Gateway Function ACK messages that are exchanged between the GWs 920 and the SP 960.

TABLE 3

| Message Name | Information | Description |
| --- | --- | --- |
| GW Function Command | GW ID Device ID Embedded GW Functions PAE Network Discovery Etc. | Inform the GWs of the functions selected by the SP among the Embedded GW Functions. |
| GW Function ACK | GW ID Device ID ACK/NACK Reason | Response to the GW Function Command. When negotiation fails, it includes the reason of negotiation failure. |

Figure 11:
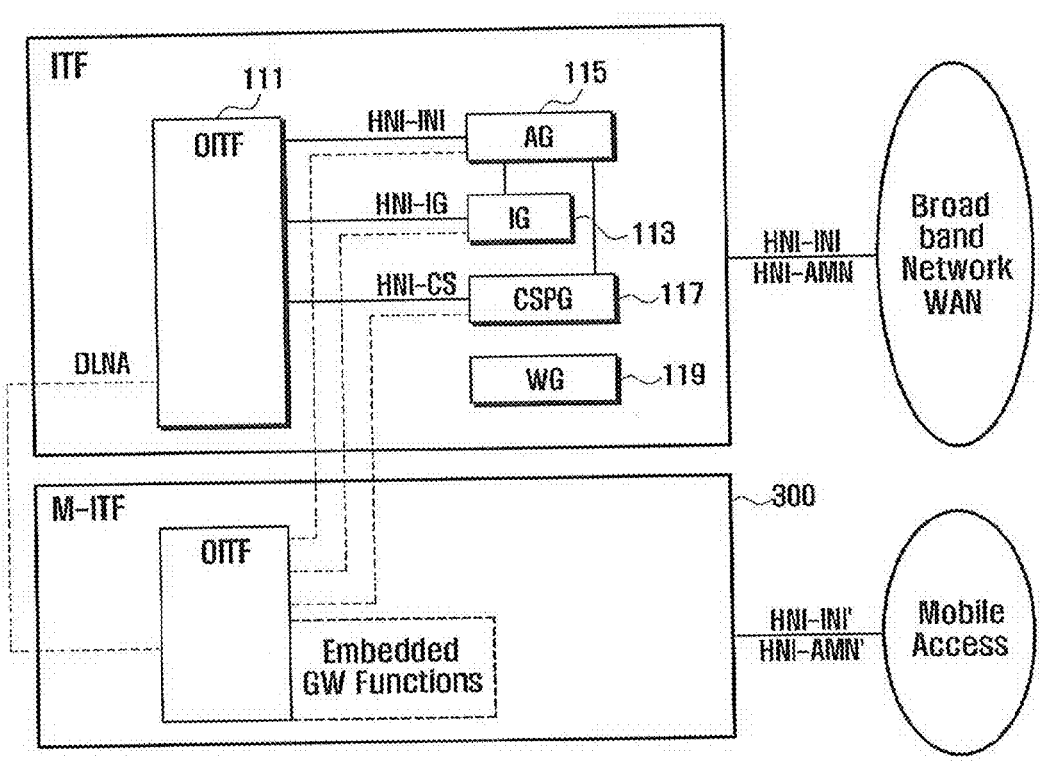
FIG. 11 is a diagram illustrating a configuration of an IPTV service provision system according to another embodiment of the present invention.

FIG. 11 is a diagram illustrating a configuration of an IPTV service provision system according to another embodiment of the present invention.

Referring to FIG. 11, dotted lines indicate the interfaces activated when the M-ITF 300 enters the indoor network. The M-ITF 300 can be configured such that the interface between the Embedded GW Functions of the M-ITF 300 and the network can be disabled when the M-ITF enters the indoor network.

Figure 12:
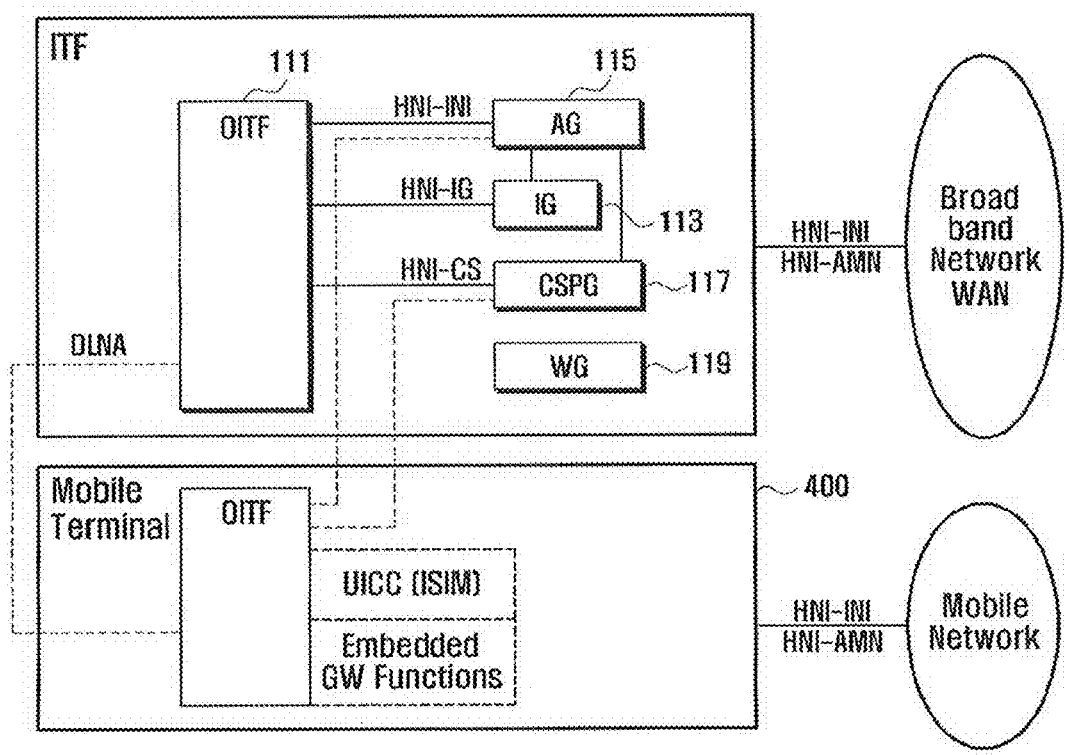
FIG. 12 is a diagram illustrating a configuration of an IPTV service provision system according to another embodiment of the present invention.

FIG. 12 is a diagram illustrating a configuration of an IPTV service provision system according to another embodiment of the present invention.

Referring to FIG. 12, the IPTV service provision system is configured in different manner from the IPTV service provision system of FIG. 7 in which the M-ITF is connected to the OITF-compliant equipment for providing the user with the IPTV service in the indoor environment. The mobile device is capable of receiving the IPTV service using in-built ISIM or IG rather than use of the IG of the ITF according to a user configuration or a default configuration of the mobile device. In this case, the IG interface can be omitted in the mobile device. The mobile device can generates an SIP message and transmit the SIP message to the IPTV service network via the WG without involvement of the IG of the ITF.

Figure 13:
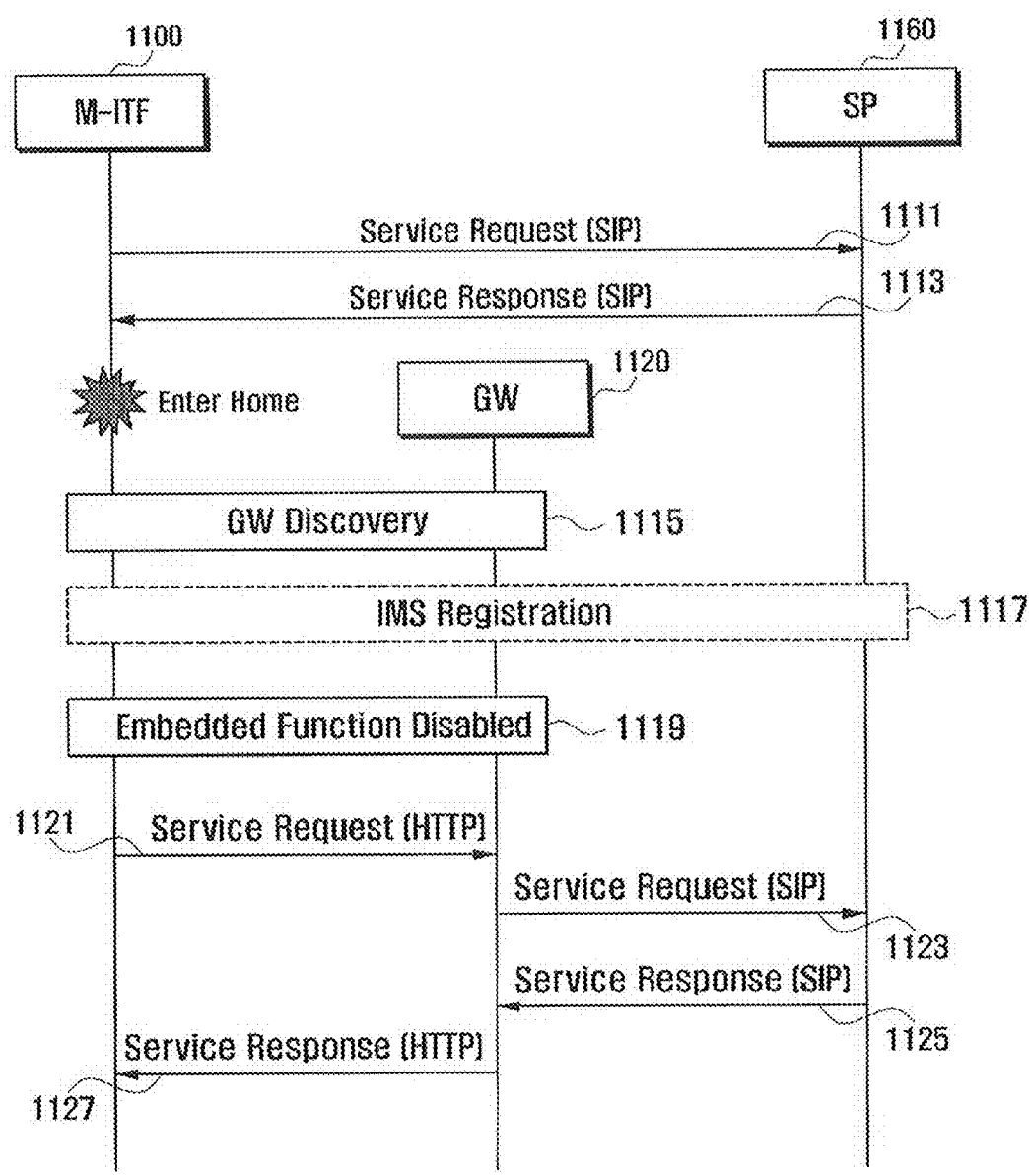
FIG. 13 is a sequence diagram illustrating operations of the M-ITF, GW, and SP when the M-ITF is within the indoor network in the IPTV service provision system according to an embodiment of the present invention.

FIG. 13 is a sequence diagram illustrating operations of an M-ITF 1100, a GW 1120, and an SP 1160 when the M-ITF 1100 is within an indoor network in an IPTV service provision system according to an embodiment of the present invention.

Referring to FIG. 13, the following description is made with the assumption that the M-ITF 1100 is connected to a wireless access network in the outdoor environment. First the M-ITF 1100 sends a service request message (as an SIP message) to the SP 1160 by means of an SIP message, in step 1111. The SP 1160 sends a service response message (as an SIP message) to the M-ITF 1100 in response to the service request message, in step 1113. Upon receiving the service response message, the M-ITF 1100 is in a state to receive the IPTV service.

If the M-ITF 1100 connected to the wireless access network enters the indoor network, the M-ITF 1100 performs a gateway discovery procedure to discover a gateway function of the indoor network, in step 1115. Here, the gateway function 1120 includes IG, AG, CSPG, and WG. If a gateway function 1120 of the indoor network is found, the gateway function 1120 also detects the indoor network entry of the M-ITF. Next, the M-ITF 1100 registers with a service provider network through an IMS Registration procedure with the assistance of the gateway function 1120, in step 1117. If the M-ITF 1100 has already registered with the service provider network by means of the gateway function 1120, this procedure can be omitted. The gateway discovery procedure can be performed with the Universal Plug and Play (UPnP) Discovery & Description mechanism.

If the registration with the indoor network and the service provider network has successfully completed, the M-ITF 1100 disables its Embedded GW Functions according to a user manipulation so as to receive the service through the indoor network, in step 1119. Once the Embedded GW Functions of the M-ITF 1100 are disabled, the gateway function 1120 of the indoor network can control the M-ITF 1100 and the Embedded Functions using the UPnP Device Management (UPnP DM) mechanism or other control messages. The M-ITF 1100 can be configured to disable its Embedded GW Functions automatically when the M-ITF is connected to the indoor network.

After the Embedded Functions are disabled, the M-ITF 1100 sends a service request message (as an HTTP message) to the indoor gateway function 1120 to request for the IPTV service, in step 1121. At this time, the M-ITF transmits the service request message using the same protocol as the OITF. The gateway function converts the service request message to an SIP format and sends the converted service request message (as an SIP message) to the SP 1160 network, in step 1123. The service provider network 1160 sends a service response message (as an SIP message) to the gateway function of the indoor network in response to the service request message, in step 1125. The gateway 1120 converts the service response message to an HTTP format and sends the converted service response message (as an HTTP message) to the M-ITF 1100, in step 1127.

Figure 14:
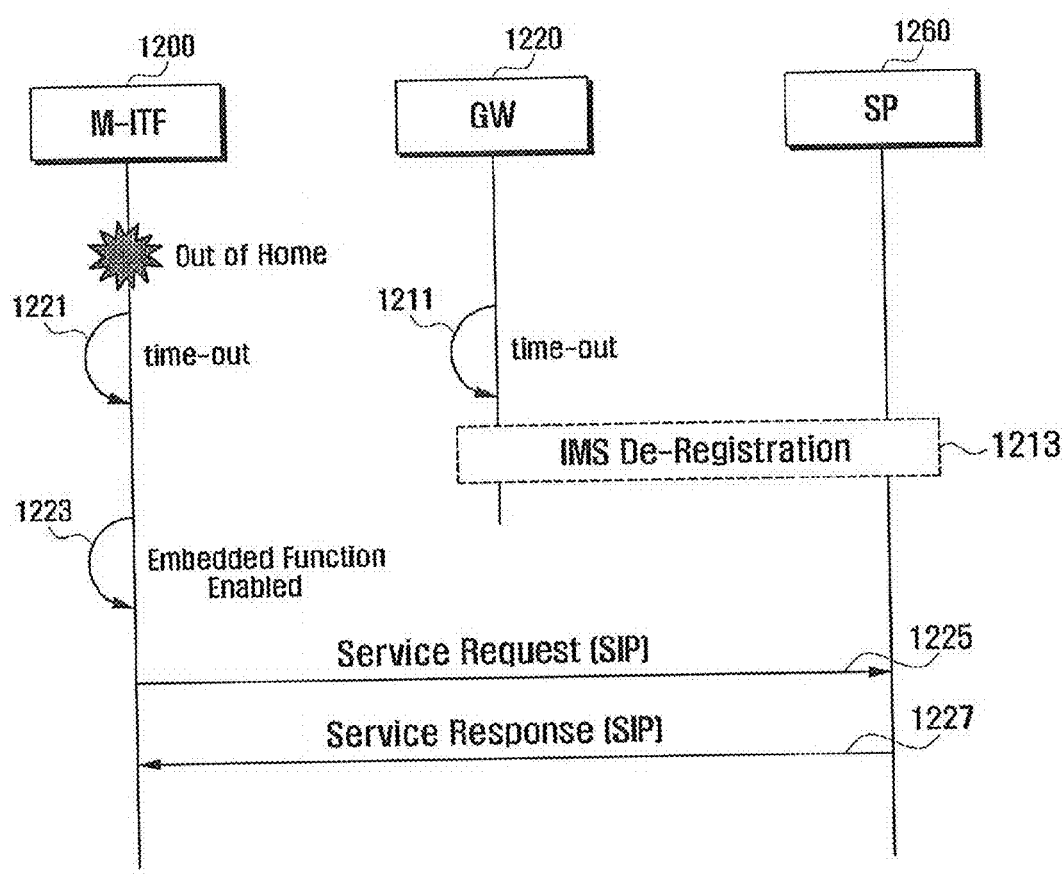
FIG. 14 is a sequence diagram illustrating operations of the M-ITF, GW, and SP when the M-ITF leaves from the indoor network in the IPTV service provision system to an embodiment of the present invention.

FIG. 14 is a sequence diagram illustrating operations of an M-ITF 1200, a GW 1220, and an SP 1260 when the M-ITF 1200 leaves from the indoor network in the IPTV service provision system to an embodiment of the present invention.

When the M-ITF 1200 stays in the indoor network, the M-ITF 1200 exchanges messages with the gateway function 1220 of the indoor network to maintain the registration state. If the M-ITF 1200 leaves the indoor network, the gateway function 1220 of the indoor network and the M-ITF 1200 cannot receive the messages from each other such that the timers operating at the gateway function and the M-ITF expire, in steps 1211 and 1221, resulting in indoor network deregistration. If no message is received from the M-ITF 1200 before the timeout of the timer, the gateway function 1220 determines that the M-ITF 1200 has left from the indoor network, and performs an IMS De-Registration procedure, in step 1213. Through the IMS De-Registration procedure, the service provider network deregisters the M-ITF 1200. The IMS De-Registration procedure can be omitted to maintain the registration state of the M-ITF 1200 in consideration cases where the M-ITF 1200 re-enters the indoor network.

Meanwhile, if no messages are received from the gateway function 1220 before the timeout of the timer, the M-ITF 1200 determines that the M-ITF 1200 has left the indoor network, and enables Embedded Functions of the M-ITF, in step 1223. Once the Embedded Functions are enabled, the M-ITF 1200 can receive the IPTV service via the wireless access network. After enabling the Embedded Functions, the M-ITF 1200 sends a service request message as an SIP message to the wireless access network by means of the SIP, in step 1225. The service provider network 1260 sends a service response message (as an SIP message to the M-ITF 1200 in response to the service request message, in step 1227. As a consequence, the M-ITF 1200 receives the IPTV service via the wireless network.

The structures and functions of the IPTV service provision system for providing an M-ITF equipped with an OIPF function with the IPTV service have been described with reference to FIGS. 2 to 12.

An IPTV service provision method and system for providing legacy mobile devices supporting other mobile broadcast services (such as OMA BOAST, DVB-CBMS, and MediaFLO) with IPTV services is described with reference to FIGS. 13 to 17.

Although the service provision mechanisms, procedures and internal functions of the mobile broadcast service technologies such as BOAST, CBMS, and MediaFLO differ from each other, these technologies are developed to provide the broadcast services, whereby these technologies can be considered to adapt the IPTV service to the mobile devices enabled with these technologies. In an embodiment of the present invention, these technologies-enabled devices are not required to have an OITF Function entity but an adaptation function to receive the IPTV service. With the adaptation function, it is possible for the legacy broadcast-enabled mobile device to receive an IPTV service with minimum modification, whereby a user can enjoy both the IPTV service and other mobile broadcast services with a minimum cost burden.

Figure 15:
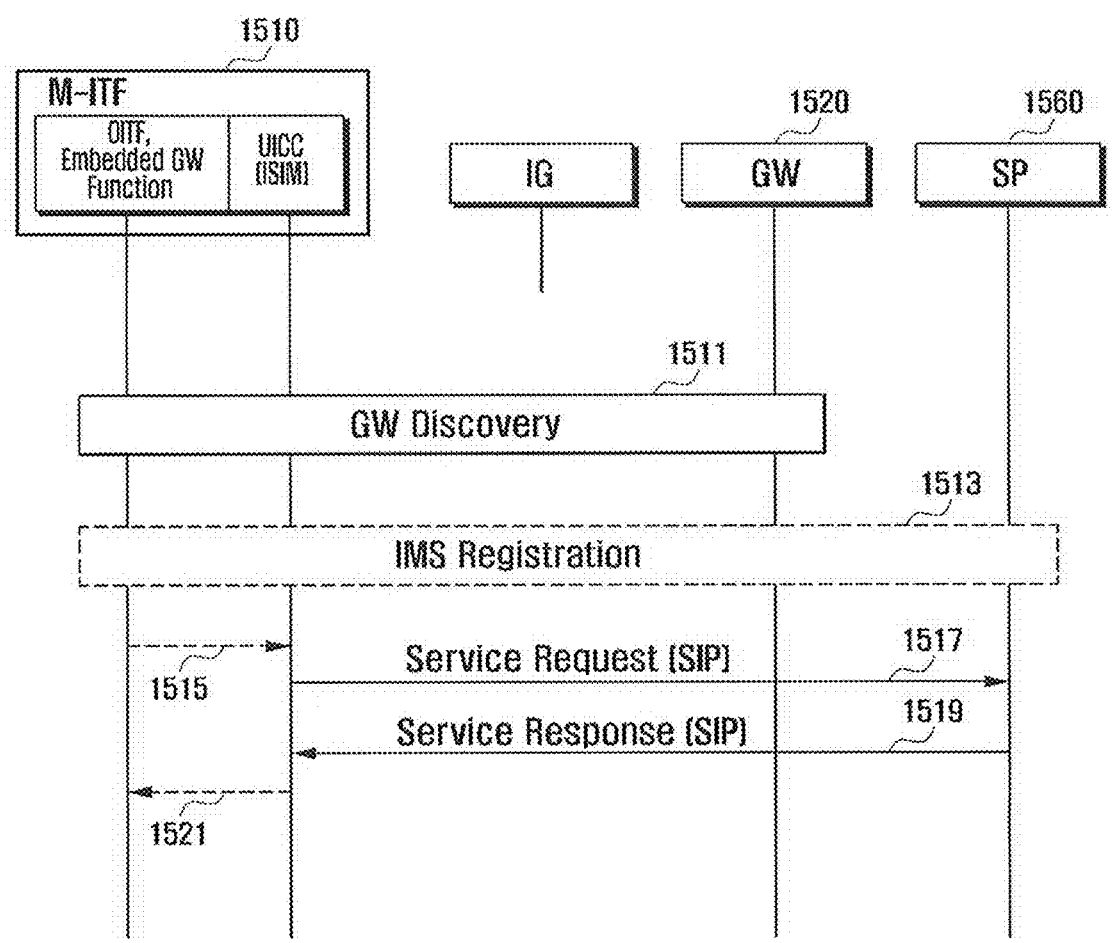
FIG. 15 is a sequence diagram illustrating operations of an M-ITF, a WG, an IG, and an SP when the M-ITF receives the IPTV service using its own ISIM or IG in an indoor environment.

FIG. 15 is a sequence diagram illustrating operations of an M-ITF, a WG, an IG, and an SP when the M-ITF receives the IPTV service using its own ISIM or IG in an indoor environment.

Referring to FIG. 15, the M-ITF includes functions of the OITF, Embedded Gateway Functions, and the ISIM. In this case, the IG subset function can be removed from the Embedded Gateway Functions. If the M-ITF 1510 enters the indoor network, the M-ITF 1510 is allocated a new IP address from the GW1 520 and performs a Gateway Discovery process to discover a gateway function, in step 1511. If the gateway function is found, the M-ITF 1510 performs an IMS registration process to register the newly allocated IP address with the service provider network, in step 1513. Once the registration is successfully completed, the M-ITF can receive the control signal and contents transmitted by the service provider via the GW 1520 of the indoor network. Therefore, the M-ITF is in a state capable of receiving the IPTV service.

In this state, the M-ITF can request a service from the service provider, and receives the service provided by the service provider. More specifically, the OITF of the M-ITF sends a service request message to the ISIM of the M-ITF, in step 1515. Here, step 1515 is an internal signaling process of the M-ITF. Upon receiving the service request message from the OITF, the ISIM sends the service request message (in the form of a SIP message) to the service provider network 1560, in step 1517. The service provider network 1560 sends a service response message (in the form of a SIP message) to the M-ITF 1510 in response to the service request message such that the ISIM of the M-ITF receives the response message, in step 1519. Upon receiving the service response message, the ISIM transfers the received service response message to the OITF, in step 1521, and terminates the procedure.

The IPTV service reception procedure of the M-ITF in the outdoor environment in a system according to FIG. 15 is identical with the IPTV service reception procedure of the M-ITF in an outdoor environment described with reference to FIG. 14.

Figure 16:
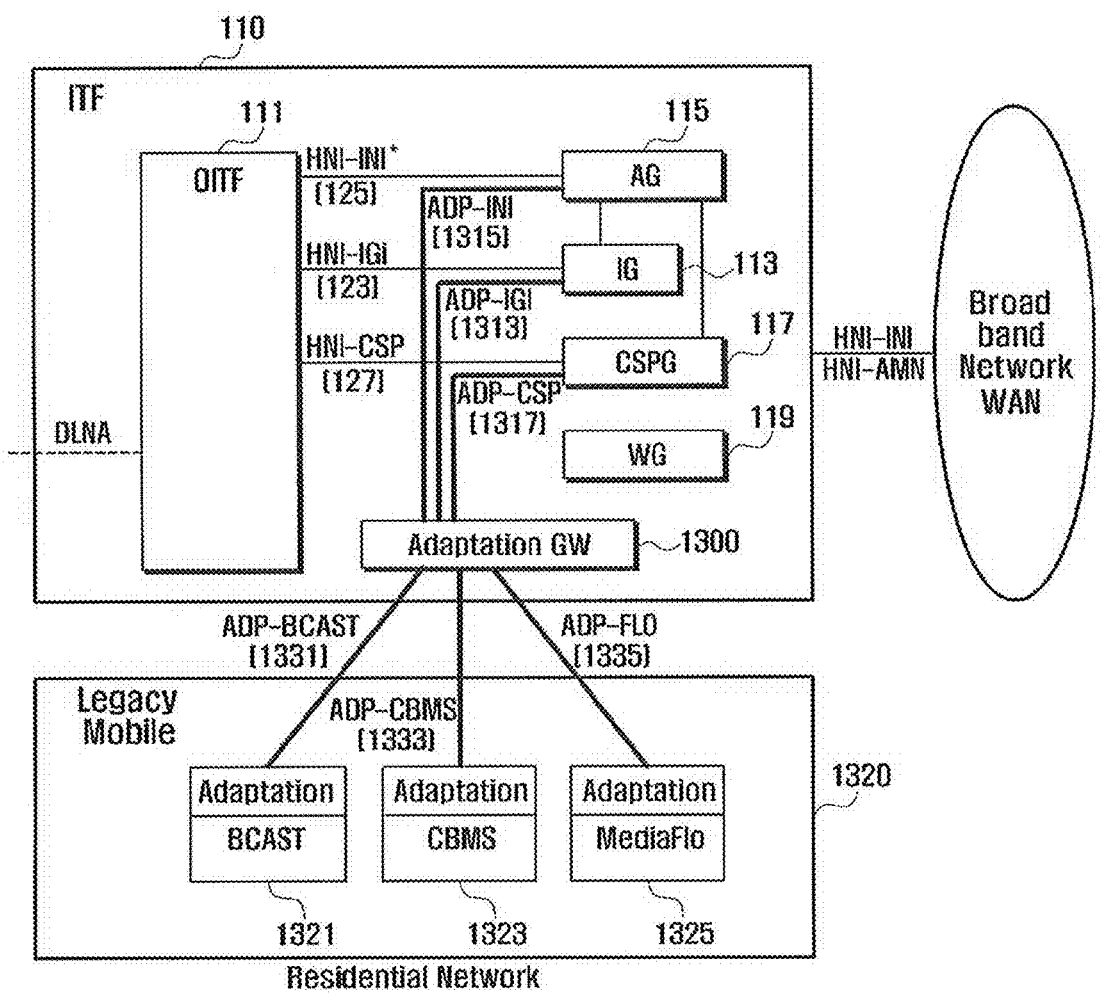
FIG. 16 is a diagram illustrating a configuration of an IPTV service provision system for supporting legacy mobile devices according to an embodiment of the present invention.

FIG. 16 is a diagram illustrating a configuration of an IPTV service provision system for supporting legacy mobile devices according to an embodiment of the present invention.

Referring to FIG. 16, an ITF 110 further includes an adaptation GateWay (GW) 1300 for adapting the IPTV service to legacy mobile devices (such as BOAST, CBMS, and MediaFLO devices) along with the interfaces defined between the adaptation gateway and other gateways of the ITF 110 and between the adaptation gateway 1300 and the legacy mobile devices. In FIG. 16, the adaptation gateway 1300 is a functional entity for adapting the OIPF-based IPTV service to the BOAST, CBMS, and MediaFLO devices such that these mobile devices can receive the IPTV service through the ITF 110. The adaptation gateway requests the AG, IG, and CSPG of the ITF for the IPTV service, converts the IPTV service to a format suitable for a legacy mobile device 1320, and supplies the IPTV service to the legacy mobile device in the format supported by the legacy mobile device 1320. For this purpose, new interfaces are defined between the adaptation gateway 1300 and the gateway function including the AG 115, IG 113, CSPG 117, and WG 119. These new interfaces include the ADP-INI 1315 interface defined for message exchange between the adaptation gateway 1300 and the AG 115 on the basis of the HNI-INI* 125 interface protocol, ADP-IGI 1313 interface defined for message exchange between the adaptation gateway 1300 and the IG 113 on the basis of the HNI-IGI 123 interface protocol, and ADP-CSP 1317 interface defined for message exchange between the adaptation gateway 1300 and the CSPG 117 on the basis of the HNI-CSP 127 interface protocol.

The legacy mobile device 1320 (for example, a BOAST device, a CBMS device, or a MediaFLO device) is provided with an adaptation function for connecting to the ITF 110. The adaptation function is implemented to provide an interface with the adaptation gateway 1300 of the ITF 110 for exchanging messages and data with the ITF 110. If necessary, the adaptation function can be provided with data display format function. The interface between the adaptation gateway 1300 of the ITF 110 and adaptation function of the legacy mobile device 1320 is determined depending on the mobile broadcast service supported by the legacy mobile device. For instance, an ADP-BOAST interface 1331 is defined for communication between the BOAST device 1321 and the Adaptation Gateway 1300, an ADP-CBMS interface 1333 is defined for communication between the CBMS device 1323 and the Adaptation Gateway 1300, and an ADP-FLO interface 1335 is defined for communication between the MediaFLO device 1325 and the Adaptation Gateway 1300.

The ADP-BCAST, ADP-CBMS, and ADP-FLO interfaces 1331, 1333, and 1335 are newly defined for message exchanges between the adaptation gateway 1300 of the ITF 110 and the adaptation functions of the BOAST, CBMS, and MediaFLO devices 1321, 1323, and 1325. Table 4 includes details of messages exchanged through the ADP-BOAST, ADP-CBMS, and ADP-FLO interfaces 1331, 1333, and 1335.

TABLE 4

| Message name | Information | Description |
|---|---|---|
| Capa./Negotiation REQ/RSP | Device ID Mobile Broadcast service type Codec Storage, etc. | Messages the legacy mobile device to inform the adaptation GW of type of Dedicated broadcast service and capability of the legacy mobile device and reply. |
| Service Noit./ACK | Device ID Service Type Service Info. Result | Messages for the adaptation GW to notify the legacy mobile device of the receipt of IPTV service, service guide and incoming call, and reply. |
| Service REQ/RSP | Device ID Service Info. Result | Messages for the legacy mobile device to request the adaptation GW for IPTV service and reply. |

For instance, the adaptation function of the BOAST device 1321 converts a BOAST system message to a format as shown in table 4 and sends the converted message to the adaptation gateway 1300, and the adaptation gateway 1300 converts the message received from the legacy mobile device 1320 to a format suitable for the IPTV service and sends the converted message to a corresponding gateway.

Figure 17:
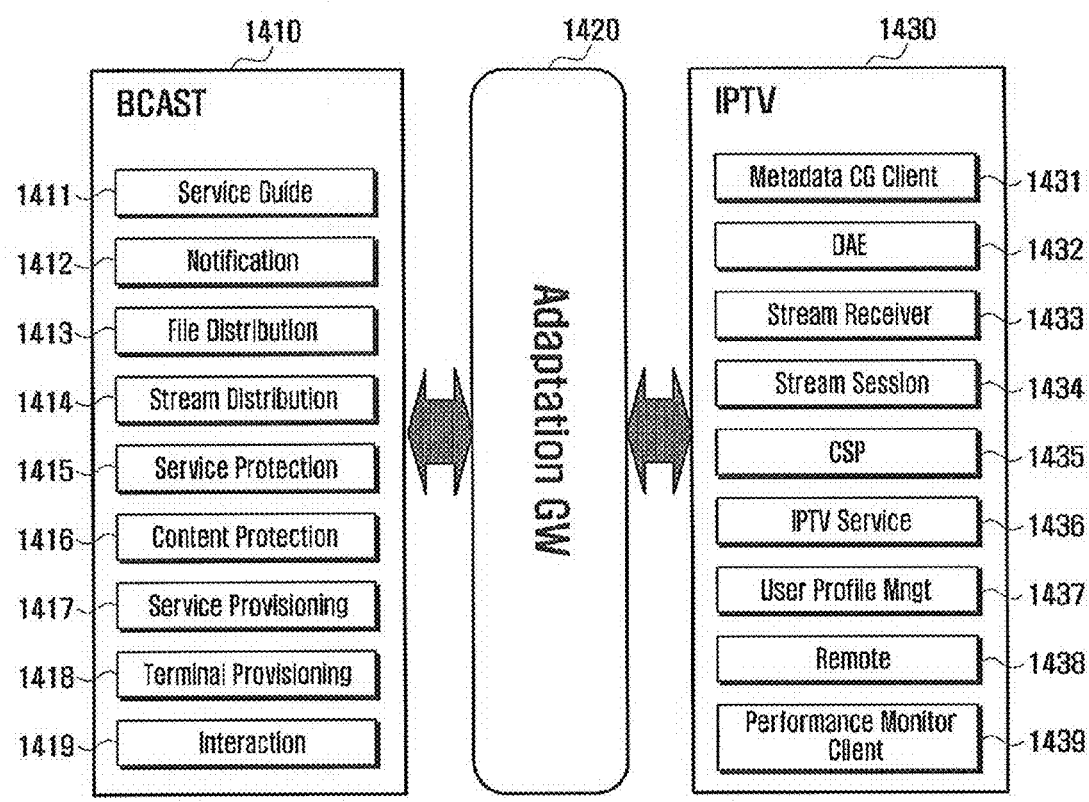
FIG. 17 is a diagram illustrating a principle of data conversion for adapting the IPTV service to a BOAST-enabled mobile device in an IPTV service provision system according to an embodiment of the present invention.

FIG. 17 is a diagram illustrating a principle of data conversion for adapting the IPTV service to a BOAST-enabled mobile device in an IPTV service provision system according to an embodiment of the present invention.

Referring to FIG. 17, the BOAST service 1410 is composed of 9 functions, i.e. Service Guide 1411, Notification 1412, File Distribution 1413, Stream Distribution 1414, Service Protection 1415, Content Protection 1416, Service Provisioning 1417, Terminal Provisioning 1418, and Integration 1419 functions. The Service Guide function 1411 is responsible for providing the user with service guides about broadcast programs. The Notification function 1412 is responsible for notifying the user of a start of broadcast services. The Stream Distribution and File Distribution functions 1414 and 1413 provide transmission and signaling methods for distributing stream and file contents. The Service Protection and Content Protection functions 1415 and 1416 provide Digital Right Management (DRM) methods for protecting stream and file transmission channels. The Service Provisioning function 1417 is responsible for managing purchase, billing, and authentication information of the user. The Terminal Provisioning function 1418 is responsible for managing configuration parameters of the devices. The Interaction function 1419 provides an uplink channel for a mobile device to transmit information to a network in a unidirectional broadcast system. Since the operation of the OMA BCAST Enabler, which operates according to OMA BCAST specifications, is beyond the scope of the present invention, a description thereof is omitted herein.

Figure 2:
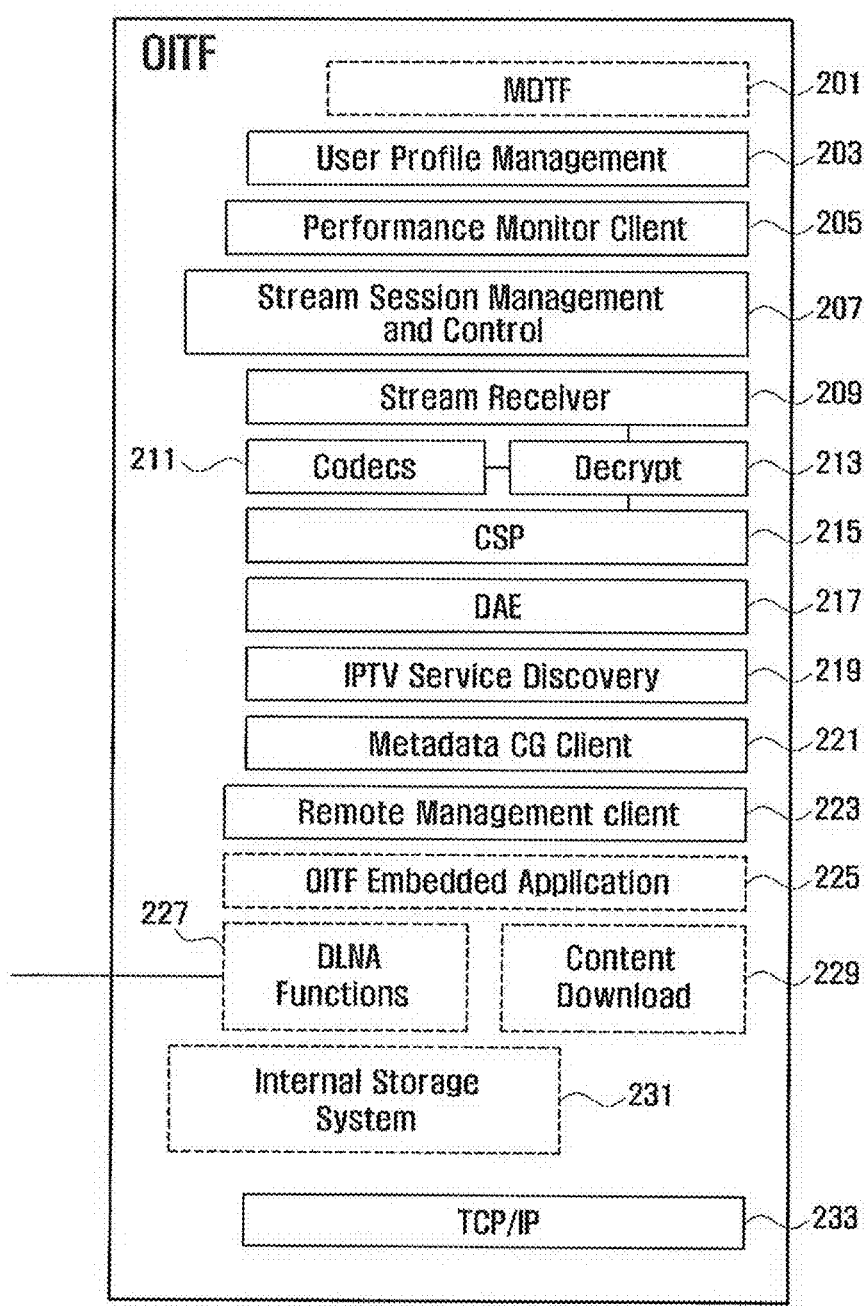
FIG. 2 is a block diagram illustrating a configuration of the OITF entity of FIG. 1.

Among the functions of the IPTV service 1430, in addition to the description already provided with reference to FIG. 2, the main functions of an IPTV service 1430 according to an embodiment of the present invention are depicted in FIG. 14. As shown in FIG. 14, the BCAST service 1410 and IPTV service 1430 are similar to each other in structure except for the technologies implementing the respective functions. According to an embodiment of the present invention, the adaptation gateway 1420 is responsible for adaptation between the BCAST and IPTV services 1410 and 1430.

Table 5 shows mappings between functions of the BOAST and IPTV services. With reference to the mapping table, the adaptation gateway 1420 converts the IPTV service 1430 to a format suitable for the BOAST service 1410.

TABLE 5

| IPTV | BCAST |
|---|---|
| Metadata CG Client | Service Guide |
| DAE | Service Guide, Notification |
| Stream Receiver/Stream Session Mngt. | File Distribution/Stream Distribution |
| CSP | Service protection/Content Protection/Service Provisioning |
| IPTV Service Discovery | Service Guide |
| User Profile Mngt. | Service Provisioning |
| Remote Management | Terminal Provisioning |
| Performance Monitor Client | File Distribution/Stream Distribution |

Figure 18:
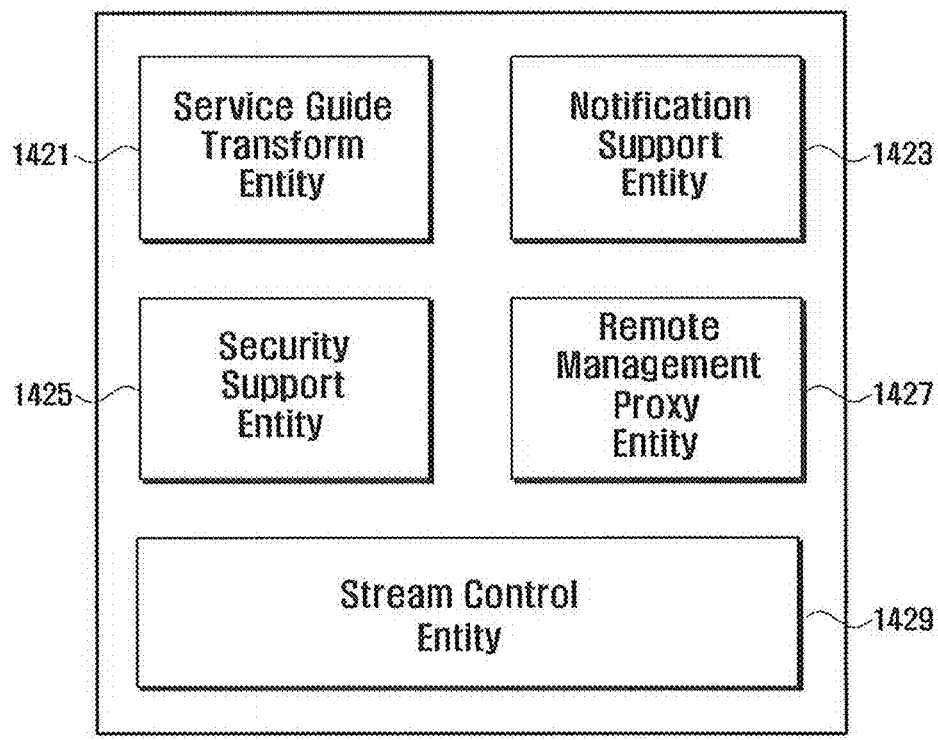
FIG. 18 is a diagram illustrating an internal structure of the adaptation gateway of FIG. 17.

FIG. 18 is a diagram illustrating an internal structure of the adaptation gateway 1420 of FIG. 14. The adaptation gateway 1420 maps the functions of the IPTV and BOAST services 1430 and 1410 as shown in table 5.

As shown in FIG. 18, the adaptation gateway 1420 includes a Service Guide Transform entity 1421, a Notification Support entity 1423, a Security Support entity 1425, a Remote Management Proxy entity 1427, and a Stream Control entity 1429. The Service Guide Transform entity 1421 converts the Metadata CG Client function 1431 of the IPTV service 1430 to the Service Guide function 1411 of the BCAST service 1410. The Notification Support entity 1423 converts the notification function of the IPTV service 1430 such as DAE to the Service Guide and Notification functions 1411 and 1412 of the BCAST service 1410. The Security Support entity 1425 converts the Security function of the IPTV service 1430 to a security function of the BCAST service 1410. The Remote Management Proxy entity 1427 converts the Remote Management function 1438 to the Terminal Provision function 1418 of the BCAST service 1410. The Stream Control entity 1429 converts the Stream Receiver and Stream Session Management functions 1433 and 1434 of the IPTV service 1430 to the File Distribution and Stream Distribution functions 1413 and 1414 of the BCAST service 1410.

Figure 19:
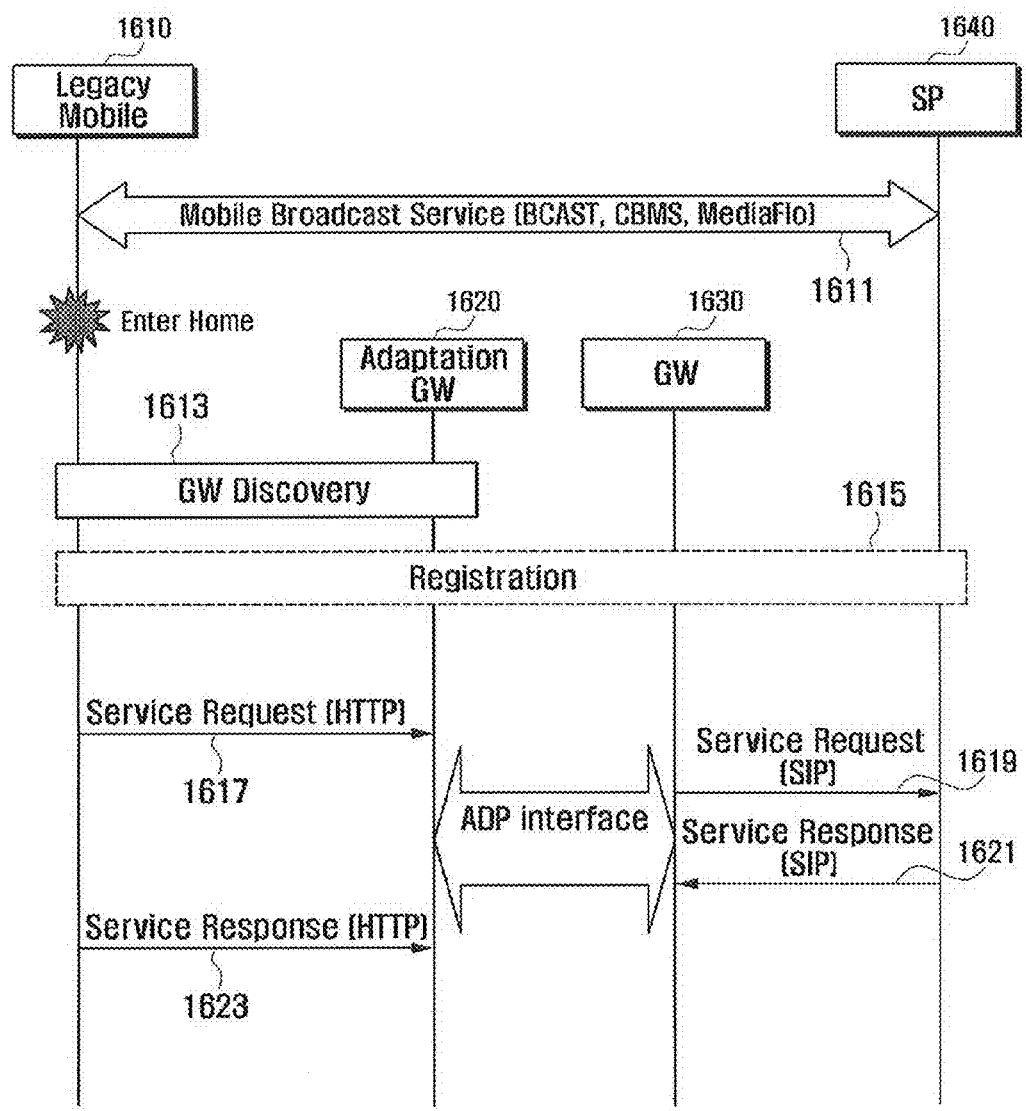
FIG. 19 is a sequence diagram illustrating operations of a legacy mobile device, an adaptation gateway, a gateway function, and a service provider network when the legacy mobile device enters an indoor network in the IPTV service provision system according to an embodiment of the present invention.

FIG. 19 is a sequence diagram illustrating operations of a legacy mobile device 1610, an adaptation gateway 1620, a gateway function 1630, and a service provider network 1640 when the legacy mobile device 1610 enters an indoor network in the IPTV service provision system according to an embodiment of the present invention.

Referring to FIG. 19, the legacy mobile device 1610 receives the mobile broadcast service such as BOAST, CBMS, and MediaFLO, in step 1611. If the legacy mobile device 1610 enters the indoor network in the middle of receiving the mobile broadcast service, the legacy mobile device 1610 performs a gateway discovery procedure to discover a gateway function 1630 of the indoor network, in step 1613. If the gateway function 1630 is found, this means that the gateway function 1630 also detects the indoor network entry of the legacy mobile device 1610. Next, the legacy mobile device 1610 registers with the service provider network 1640 via the adaptation gateway 1620 and the gateway function 1630, in step 1615. If the mobile device has already registered with the service provider network 1640 by means of the gateway function 1630 of the indoor network, step 1613 can be omitted.

If the registration with the indoor network and the service provider network 1640 has successfully completed, the legacy mobile device sends a service request message (in the form of an HTTP message) to the adaptation gateway 1620 to request for the IPTV service, in step 1617. At this time, the legacy mobile device 1610 transmits the service request message using the protocol (e.g. HTTP) defining the ADP-BOAST, ADP-CBMS, and ADP-FLO interfaces 1331, 1333, and 1335 described with reference to FIG. 16. The adaptation gateway 1630 converts the service request message (HTTP message) to a format suitable for use in the indoor network and sends the converted service request message to the gateway function 1630 via an ADP interface such as an ADP-INI, an ADP-IGI, or an ADP-CSP interface. The gateway function converts the service request message to an SIP formation and sends the converted service request message (SIP message) to the service provider network 1640, in step 1619. The service provider network 1640 sends a service response message (as an SIP message) to the gateway function 1630 of the indoor network in response to the service request message, in step 1621. If the service response message (i.e, the SIP message) is received from the service provider network 1640, the gateway function 1630 forwards the service response message to adaptation gateway 1620. The adaptation gateway 1620 converts the service response message to an HTTP format and sends the converted service response message (as an HTTP message) to the legacy mobile device 1610, in step 1623.

In this manner, the legacy mobile device 1610 can receive the IPTV service via an indoor network as well as via a legacy mobile broadcast service.

Figure 20:
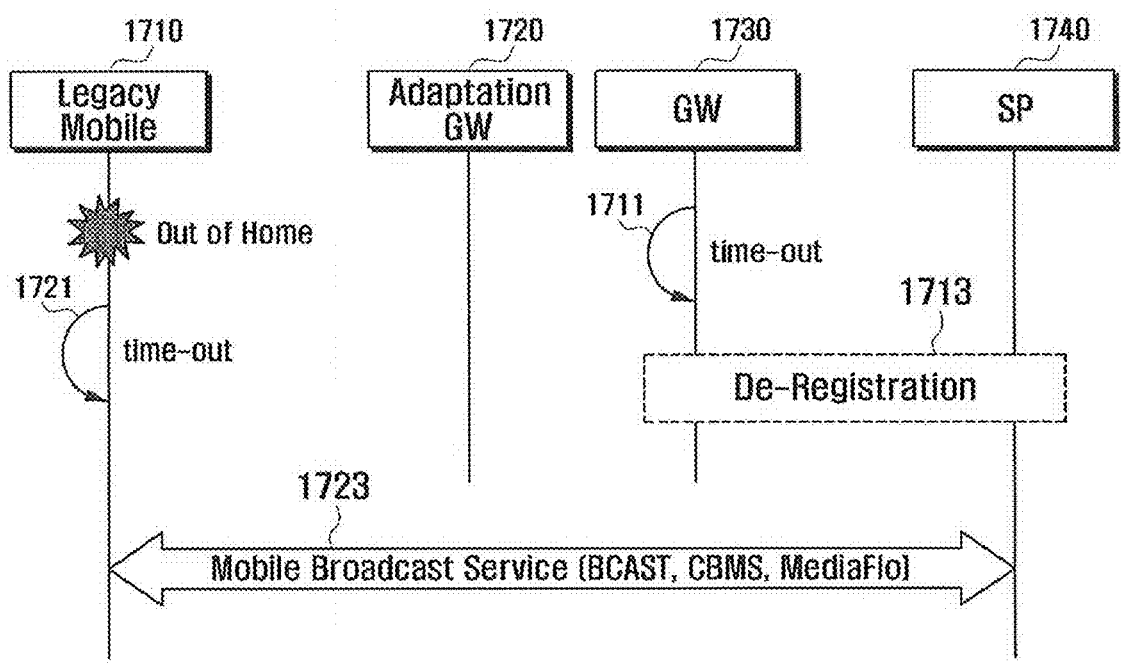
FIG. 20 is a sequence diagram illustrating operations of a legacy mobile device, an adaptation gateway, a gateway function, and a service provider network when the legacy mobile device leaves from the indoor network in the IPTV service provision system according to an embodiment of the present invention.

FIG. 20 is a sequence diagram illustrating operations of a legacy mobile device 1710, an adaptation gateway 1720, a gateway function 1730, and a service provider network 1740 when the legacy mobile device 1710 leaves from the indoor network in an IPTV service provision system according to an embodiment of the present invention.

When the legacy mobile device 1710 stays in the indoor network, the legacy mobile device 1710 exchanges messages with the gateway functions of the indoor network to maintain the registration state. If the legacy mobile device leaves the indoor network, the gateway function 1730 of the indoor network and the legacy mobile device 1710 cannot receive the messages from each other such that the timers operating at the gateway function 1730 and the legacy mobile device 1710 expire, as in steps 1711 and 1721, resulting in indoor network deregistration. If a timeout of a timer is detected, the legacy mobile device 1710 determines that the legacy mobile device 1710 has left the indoor network. In this case, the legacy mobile device 1710 cannot receive IPTV services but rather mobile broadcast services instead. Accordingly, the legacy mobile device 1710 that has left the indoor device receives mobile broadcast services such as BOAST, CBMS, and MediaFLO, in step 1723.

Also, if the gateway function 1730 detects a timeout of a timer, the gateway function 1730 performs a De-Registration procedure with the service provider network 1740 to deregister the legacy mobile device 1710, in step 1713. If the timeout of the timer is detected, the gateway function 1730 determines that the legacy mobile device 1710 has turned off or left the indoor network, and performs a De-registration procedure with the service provider network 1740 such that the service provider network deregisters the legacy mobile device 1710.

The De-Registration procedure can be omitted to maintain the registration state of the legacy mobile device in consideration of the case when the legacy mobile device re-enters the indoor network.

As described above, the IPTV service provision method and system according to embodiments of the present invention allows a mobile device to access IPTV services via various broadcast and communication systems. Also, the IPTV service provision method and system according to embodiments of the present invention allow users to enjoy IPTV services using legacy mobile devices as well as device-specific mobile broadcast services.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for providing an internet protocol television (IPTV) service by an IPTV terminal, the method comprising:
    establishing a link with an adaptation gateway if the IPTV terminal detects the adaptation gateway;
    disabling a link with an embedded gateway of the IPTV terminal, upon establishing the link with the adaptation gateway; and
    requesting an IPTV service to a service provider network using a function of the adaptation gateway.

2. The method of claim 1, further comprising:
    enabling the link with the embedded gateway if a detachment of the IPTV terminal from the adaptation gateway is detected; and
    establishing a wireless link to a wireless access network using the embedded gateway.

3. The method of claim 1, wherein the adaptation gateway is included in a device and the device comprises an IMS gateway (IG), an application gateway (AG), a cache server pages gateway (CSPG), and a WAN gateway (WG).

4. The method of claim 3, wherein establishing the link with the adaptation gateway comprises performing an IP multimedia subsystem (IMS) registration procedure.

5. The method of claim 3, wherein establishing the link with the adaptation gateway comprises selecting functions of the embedded gateway to be used by transmitting a function negotiation request message to the adaptation gateway.

6. The method of claim 3, wherein establishing the link with the adaptation gateway comprises determining functions of the embedded gateway to be used by the service provider network or the IPTV Terminal.

7. The method of claim 2, wherein establishing the link with the adaptation gateway comprises:
    transmitting, if a capability request message is received from the adaptation gateway, a capability response message with information regarding functions of the embedded gateway to the adaptation gateway; and
    transmitting, if a function negotiation request message is received from the adaptation gateway, a function negotiation response message with functions to be used to the adaptation gateway.

8. A method for providing an internet protocol television (IPTV) service by an IPTV terminal, the method comprising:
    discovering an adaptation gateway;
    establishing a link with the adaptation gateway, upon discovering the adaptation gateway;
    disabling a link with an embedded gateway of the IPTV terminal, upon establishing the link with the adaptation gateway;
    transmitting a service request message in a Hyper-Text Transfer Protocol (HTTP) format to the adaptation gateway;
    transmitting the service request message in a session initiation protocol (SIP) format from the adaptation gateway to a service provider network;
    transmitting a service response message in an SIP format from the service provider network to the adaptation gateway;
    receiving the service response message in an HTTP format from the adaptation gateway; and
    receiving an IPTV service provided by the service provider network using a function of the adaptation gateway.

9. An interne protocol television (IPTV) terminal providing an IPTV service, comprising:
    at least one embedded gateway configured to establish a link; and
    a controller configured to establish a link with an adaptation gateway if the IPTV terminal detects the adaptation gateway, disable a link with the at least one embedded gateway upon establishing the link with the adaptation gateway, and request an IPTV service to a service provider network using a function of the adaptation gateway.

10. The IPTV terminal of claim 9, wherein the IPTV terminal further comprises at least one of an IMS gateway (IG), an application gateway (AG), a cache server pages gateway (CSPG), and a WAN gateway (WG).

11. A method for providing an internet protocol television (IPTV) service by an IPTV terminal, the method comprising:
    discovering an adaptation gateway of a device;
    establishing a link with the adaptation gateway, upon discovering the adaptation gateway;
    transmitting a service request message in a hyper-text transfer protocol (HTTP) format to the adaptation gateway;
    establishing adaptation (ADP) interfaces between the adaptation gateway and the gateways of an IPTV terminal function (ITF);
    transmitting the service request message in a session initiation protocol (SIP) format from the adaptation gateway to a service provider network;
    transmitting a service response message in an SIP format from the service provider network to the adaptation gateway;
    receiving the service response message in an HTTP format from the adaptation gateway; and
    receiving an IPTV service from the service provider network via the ITF.

12. An internet protocol television (IPTV) terminal providing an IPTV service, comprising:
    at least one embedded gateway configured to establish a link; and
    a controller configured to discover an adaptation gateway of a device, establish a link with the adaptation gateway, upon discovering the adaptation gateway, transmit a service request message in a hyper-text transfer protocol (HTTP) format to the adaptation gateway, establish adaptation (ADP) interfaces between the adaptation gateway and the gateways of an IPTV terminal function (ITF), transmit the service request message in a session initiation protocol (SIP) format from the adaptation gateway to a service provider network, transmit a service response message in an SIP format from the service provider network to the adaptation gateway, receive the service response message in an HTTP format from the adaptation gateway, and receive an IPTV service from the service provider network via the ITF.

\* \* \* \* \*